US012667795B2

(12) United States Patent
Zhou et al.

(10) Patent No.: US 12,667,795 B2
(45) Date of Patent: Jun. 30, 2026

(54) POLYMER IMPURITY REMOVAL METHOD BASED ON STEAM DISTILLATION

(71) Applicant: Shanghai Institute of Organic Chemistry, Chinese Academy of Sciences, Shanghai (CN)

(72) Inventors: Jiaolong Zhou, Shanghai (CN); Zehao Zhao, Shanghai (CN); Yong Tang, Shanghai (CN); Xiuli Sun, Shanghai (CN); Jie Zhu, Shanghai (CN)

(73) Assignee: Shanghai Institute of Organic Chemistry, Chinese Academy of Sciences, Shanghai (CN)

( * ) Notice: Subject to any disclaimer, the term of this patent is extended or adjusted under 35 U.S.C. 154(b) by 0 days.

(21) Appl. No.: 17/641,797

(22) PCT Filed: Sep. 9, 2020

(86) PCT No.: PCT/CN2020/114242
§ 371 (c)(1),
(2) Date: Mar. 9, 2022

(87) PCT Pub. No.: WO2021/047545
PCT Pub. Date: Mar. 18, 2021

(65) Prior Publication Data
US 2024/0042344 A1 Feb. 8, 2024

(30) Foreign Application Priority Data

Sep. 9, 2019 (CN) .......................... 201910848958.9
Sep. 9, 2019 (CN) .......................... 201910852478.X
(Continued)

(51) Int. Cl.
*B01D 3/38* (2006.01)
*C08F 110/06* (2006.01)

(52) U.S. Cl.
CPC .............. *B01D 3/38* (2013.01); *C08F 110/06* (2013.01); *B01D 2257/708* (2013.01)

(58) Field of Classification Search
None
See application file for complete search history.

(56) References Cited

U.S. PATENT DOCUMENTS 2,433,060 A * 12/1947 Ohsol ................ B01D 19/0015
203/84
2,451,332 A * 10/1948 Green ..................... C08F 6/003
159/DIG. 10
(Continued)

FOREIGN PATENT DOCUMENTS

CA        836977 A      3/1970
CN      1711125 A    12/2005
(Continued)

OTHER PUBLICATIONS

Hazardous Substance Fact Sheet—Cyclohexane, New Jersey Department of Health, 2016.*
(Continued)

*Primary Examiner* — Jonathan Luke Pilcher
(74) *Attorney, Agent, or Firm* — Calderone McKay LLC

(57) ABSTRACT

The present invention provides a method for depth removal of a volatile organic compound (VOC) in polymer resins and products thereof by means of a steam distillation method and apparatus thereof and significantly reducing the odor of the polymer resins and products thereof. The method provided in the present invention can further remove residual inorganic ash in the polymer resins. In the method, saturated steam at a certain temperature continuously keeps in contact with materials for a certain period of time, the VOC and an inorganic small molecule (ash) adsorbed on the surface of a polymer and wrapped inside the polymer are promoted to be enriched in a gas phase or a liquid phase and discharged, so
(Continued)

as to reduce the VOC and ash in polymer materials, and the odor of the polymer resins or materials is decreased to a better level.

18 Claims, 4 Drawing Sheets

(30)          Foreign Application Priority Data

Dec. 10, 2019    (CN) .......................... 201911260253.1
May 20, 2020     (CN) .......................... 202010432661.7

(56)                  References Cited

U.S. PATENT DOCUMENTS 2,870,065  A  *   1/1959   Mitchell  .................. B01D 3/14
                                                              203/79
2,929,508  A  *   3/1960   Folz  ..................... B03D 1/1456
                                                              210/512.1
3,026,314  A  *   3/1962   Cottle et al.  .............. C08F 2/14
                                                              528/502 A
3,296,240  A  *   1/1967   Macdonald  ............... C08F 6/12
                                                              159/13.4
3,454,542  A  *   7/1969   Eberhardt  ........... B01J 19/1881
                                                              526/341
3,920,624  A  *  11/1975   Humkey  ................. C08F 6/005
                                                              422/131
3,958,585  A  *   5/1976   Humkey  ................. C08F 6/005
                                                              134/61
4,171,427  A  *  10/1979   Ohorodnik  ............... B01D 3/38
                                                              422/138
4,310,973  A  *   1/1982   King  ........................ B01D 1/18
                                                              34/368
5,516,818  A  *   5/1996   Chen  ........................ C08F 6/16
                                                              523/330
2005/0197489  A1   9/2005   Hucks et al.
2006/0034777  A1   2/2006   Mahling et al.
2013/0237679  A1   9/2013   Frank et al.

FOREIGN PATENT DOCUMENTS

CN          1914233  A     2/2007
CN        103301750  A     9/2013
CN        105602646  A     5/2016

OTHER PUBLICATIONS

"Melting Point of All Types of Polyethylene You Should Know", Europlas.com, https://europlas.com.vn/en-US/blog-1/melting-point-of-all-types-of-polyethylene-you-should-know.*
"Acrylonitrile (CH=CHCN) CAS 107-13-I; UN l093", Agency for Toxic Substances and Disease Registry (ATSDR).*
"Medical Management Guidelines for 1,3-Butadiene", Agency for Toxic Substances and Disease Registry (ATSDR).*
"Public Health Statement—Styrene", Agency for Toxic Substances and Disease Registry (ATSDR), Jun. 2012.*
"Public Health Statement—Vinyl Acetate", Agency for Toxic Substances and Disease Registry (ATSDR), Jul. 1992.*
International Search Report (with English translation) from Priority Application PCT/CN2020/114242(4 pages) Dec. 15, 2020.

* cited by examiner

POLYMER IMPURITY REMOVAL METHOD BASED ON STEAM DISTILLATION

CROSS-REFERENCE TO RELATED APPLICATIONS

This application is a national stage non-provisional patent application of International Patent Application No. PCT/CN2020114242, which designates the U.S. and was published in Chinese, filed Sep. 9, 2020. This application claims priority to PCT/CN2020114242 under 35 U.S.C. §§ 363, 120.

BACKGROUND OF THE INVENTION

Field of the Invention

The present invention belongs to the field of polymer production. In particular, the present invention provides a process for removing impurity molecules, especially VOC, odor molecules and ash contents in polymers with high efficiency.

Description of Related Art

In recent years, there are higher and higher requirements for environmental protection of plastic products in production and living fields such as automotive products, household appliances, plastic toys, food contacting materials, and medical materials. Polymer resins are widely used in automotive interior and exterior trims, home appliances, toys, food packaging materials, medical materials due non-toxic, low density, easy processing, high impact strength, good corrosion resistance and heat resistance, and high cost performance thereof.

The release of volatile organic compounds (VOC) to varying degrees is still prevalent in commercial resins, due to multiple factors, such as the purity of the polymerized monomer, catalyst residues, polymerization process, the decomposition of additives, and the degradation of the resin itself. According to the US World Technology Evaluation Center, VOC is one of the most important threats to human health in modern society. The air quality is directly related to people's health. The harm of VOC pollution to people's health has attracted the attention of the country, manufacturers and consumers.

With the increasing awareness of environmental protection in society and the increasing environmental protection-related legal requirements, VOCs and odors in plastics have also received more and more attention from consumers, production enterprises and management departments. Most product manufacturers have begun to formulate VOC indicators for incoming raw materials and outgoing products, wherein, in the automotive industry, the total carbon volatilization of interior materials is required to be less than 80 µg C/g. The newly revised national standard GB 4806.1-2016 "General Safety Requirements for Food Contacting Materials and Products" clearly requires food contacting materials and products to be odorless. In addition, due to the high VOC content of the existing resin, after the produced resin enters the packaging silo, it needs to be displaced for many times. On the one hand, the difficulty of the packaging process is increased, and on the other hand, with the introduction of new air emission laws and regulations, the phenomenon of excessive discharge of replacement gas often occurs. On Jul. 1, 2017, the new version of the "Emission standard of pollutants for synthetic resin industry" began to be enforced, which stipulates that the emission limit of non-methane total hydrocarbons in general enterprises is 100 mg/m$^3$. For areas where the development density has been high, the environmental carrying capacity has begun to weaken, or the atmospheric environment capacity is small, the ecological environment is fragile, and serious atmospheric pollution problems are prone to occur and protection measures need to be taken, the pollutant discharge behavior of enterprises should be strictly controlled, and stricter emission limits (60 mg/m$^3$) should be implemented. Therefore, reducing the VOC problem in plastic production and processing has become a very urgent problem.

In response to this situation, some well-known companies and research institutions abroad have done different degrees of research on low-VOC plastics, and have made some progress. In the field of processing, measures to reduce the VOC and odor of plastic products mainly include: (1) selecting and using better, more compatible and more stable additives, or an additive system itself with synergistic effects. Since the stability can be achieved at a lower addition, the VOC and odor in the resin can be effectively reduced. (2) Optimizing the processing technology. The use of high-temperature extrusion granulation, vacuuming during the extrusion process, and high-temperature baking and drying of the formed particles can all remove residues in the polypropylene to a certain extent. (3) Adding components with good adsorption effects on low molecular residues. Studies have found that adding a certain amount of pozzolan, zeolite molecular sieve and other inorganic porous materials can also eliminate VOCs in polypropylene, although the effect is greatly affected by the specific surface, pore structure, surface structure, pore size, and pore size distribution of these substances.

The above measures have a certain effect on the release of new VOCs generated during processing, but they are not enough to solve the problem of high VOC content in the resin raw material itself. In addition, adding a large amount of adsorptive additives to the resin raw material will result in a large amount of ash in the resin. Ash refers to the residual metal and non-metal oxides after the resin is completely burned at high temperature. Resins with high ash content seriously affect the plastic processing crafts, especially for the processing methods such as film materials and spinning materials that need to be stretched. The higher ash content not only increases the production cost, but also has a great impact on the physical and chemical properties of the product and affects the mechanical properties of the plastic: causing white spots and defects in the film material; causing silk breaks during the spinning process, and decreasing mechanical strength. Taking polypropylene as an example, high-purity PP with low ash content, generally less than 0.0080% by mass, has shown good application prospects in the fields of electronic appliances, medicine, food, and textiles. The National Medical Products Administration stipulates in the standard compilation of packaging materials and containers in direct contact with drugs that the mass fraction of metal elements copper, cadmium, chromium, lead, tin and barium in PP infusion bottles determined by atomic absorption spectrophotometry shall not exceed 0.0003%. For PP used as capacitor film, the ash mass fraction is required to be no higher than 0.0050%. At present, the ash content of most resins on the market is about 0.03~0.3%. How to reduce the ash content, improve the stability of plastics during processing and use, and give full play to the performance of plastics is also an urgent problem to be solved.

In summary, there is still a lack of a method for efficiently removing VOCs, ash and reducing odor levels in resins in the art.

BRIEF SUMMARY OF THE INVENTION

The purpose of the present invention is to provide a method for removing VOC and ash in polymer materials, and reducing odor level.

In the first aspect of the present invention, provided herein is a method for deeply removing volatile organic compounds (VOC) in a polymer, reducing polymer odor, and removing inorganic ash, wherein said method comprises: removing volatile organic compounds (VOCs) and odor-forming components from the polymer by continuous contacting water vapor with the polymer.

In another embodiment, the method is carried out under normal pressure or pressurized conditions.

In the second aspect of the present invention, provided herein is a method for deeply removing inorganic ash from a polymer, the method further comprising: continuously contacting water vapor with the polymer, so as to dissolve and remove the inorganic ash from the polymer.

In another embodiment, water vapor and water in a phase equilibrium state are simultaneously contacted with the polymer.

In another embodiment, the method is carried out under normal pressure or pressurized conditions.

In another preferred embodiment, the method comprises step (a):

(a) In a reaction system, the water vapor in the phase equilibrium state is continuously contacted with the polymer for 0.5-6 hours (Example 38), preferably 0.5-3 hours.

In another embodiment, the organic compound is selected from volatile organic compounds (VOCs), odor components, or a combination thereof.

In another embodiment, the removal of the inorganic ash content means that the ash content in the polymer is reduced by ≥20% on the basis of the original ash content (concentration); and preferably, reduced to less than 110 ppm.

In another embodiment, the deep removal of organic matter means that the VOC in the polymer is reduced to ≤100 ppm, preferably ≤50 ppm, more preferably ≤10 ppm, and most preferably ≤1 ppm (tested according to VDA277 standard).

In another embodiment, the removal of the organic matter means that the odor level of the polymer material is ≤3, preferably ≤2 (tested by VW50180).

In another embodiment, the temperature of the water vapor is 100-200° C.

In another embodiment, during the contact process, the reaction system is isolated from air or oxygen; preferably, the isolation of air or oxygen means that the oxygen content of the system during the whole removal process is lower than 5% (v/v); preferably, the oxygen content of the system is less than 1% (v/v), more preferably less than 0.1% (v/v), and most preferably less than 100 ppm.

In another embodiment, the method further comprises: before step (a) is carried out, the system is purged with an inert gas or water vapor, thereby replacing the air in the system.

In another embodiment, the method further comprises: continuously feeding water vapor into the reaction system while simultaneously discharging steam and/or condensed water; and preferably, the speed at which the steam is discharged is 1-200 Kg water vapor/ton polymer/hour; preferably 1-120 Kg water vapor/ton polymer/hour; more preferably 5-50 Kg water vapor/ton polymer/hour, and most preferably 5~25 Kg water vapor/ton polymer/hour.

In another embodiment, the discharge of the steam and/or the condensed water is performed intermittently or continuously.

In another embodiment, the polymer is selected from polyethylene (PE), polypropylene (PP), polybutene PB-1, acrylonitrile/butadiene/styrene terpolymer (ABS), ethylene propylene rubber (EPDM, EPM), polyolefin elastomer (POE), olefin block copolymer (OBC), nylon (PA), polycarbonate (PC), polyethylene terephthalate (PET), polybutylene terephthalate (PBT), polystyrene or polyphenylene sulfide, or a combination thereof.

In another embodiment, the polymer is polypropylene (PP) or polypropylene-random (PPR); and preferably, the melt flow index range of the polypropylene (PP) or polypropylene-random (PPR) is 0.1-2000 g/10 min (measured under the method of GB/T 2682-2000).

In another embodiment, the polypropylene (PP) is a special resin used for medical grade, automotive interior decoration or food contacting applications.

In another embodiment, the polypropylene is a melt-blown resin, a special resin for syringes or a special resin for protective equipment.

In another embodiment, the polypropylene (PP) is a special resin for electronic and electrical components.

In another embodiment, the polyethylene is ultra-high molecular weight polyethylene UHMWPE or cross-linked polyethylene PEX.

In another embodiment, the polymer is a modified polymer, or a polymer product.

In another embodiment, the polymer is polymer particles, and the particle diameter of the particles is 0.05 mm-5 mm, preferably 0.1-3 mm.

In another embodiment, the water vapor is high-pressure water vapor or low-pressure water vapor.

In another embodiment, the temperature of the water vapor is selected according to the melting point of the polymer.

In another embodiment, the temperature of the water vapor is 2050° C. lower than the melting point of the polymer, preferably 2030° C. lower than the melting point of the polymer.

In another embodiment, when the particle diameter of the polymer is <1 mm and the VOC content in the polymer is <2000 ppm, the time for which the polymer is kept at the temperature corresponding to saturated water vapor is 0.5-3 h, more preferably 0.5-2 h.

In another embodiment, when the particle diameter of the polymer is <1 mm and the VOC content in the polymer is ≥2000 ppm, the time for which the polymer is kept at the temperature corresponding to saturated water vapor is 1-5 h, more preferably 1-3 h.

In another embodiment, when the particle diameter of the polymer is ≥1 mm and the VOC content in the polymer is <1000 ppm, the time for which the polymer is kept at the temperature corresponding to saturated water vapor is 1-5 h, more preferably 2-4 h.

In another embodiment, when the particle diameter of the polymer is ≥1 mm and the VOC content in the polymer is ≥1000 ppm, the time for which the polymer is kept at the temperature corresponding to saturated water vapor is 3-7 h, more preferably 3-5 h, more preferably 3-4 h.

In another embodiment, the water vapor is a mixture of water vapor and water in a phase equilibrium state.

In another embodiment, the step (a) comprises following sub-steps:

(a1) the polymer material is loaded in an equipment, and preferably, the equipment is a vertical or horizontal equipment;

(a2) the water vapor is passed through the equipment in step (a1), continuously and directly contacts the polymer for 0.5-6 hours in a phase equilibrium state, while the water vapor is discharged after contacting the polymer;

(a3) the polymer material is dehydrated and dried;

(a4) the polymer material dehydrated and dried in step (a3) is discharged and collected.

In another embodiment, before step (a1), the method further comprises a step of: preheating the polymer material.

In another embodiment, the method further comprises a step of: quenching the polymer material discharged after the purification.

In another embodiment, before step (a), the method further comprises a step of: pre-dehydrating the polymer material.

In another embodiment, in step (a1), the polymer is added to the equipment in batches, and steps (a2)-(a4) are carried out, thereby implementing intermittent operation.

In another embodiment, step (a1)-(a4) are carried out continuously. The continuous operation mentioned therein refers to that the polymer is continuously entered the equipment, and continuously discharged and collected in step (a4) after steps (a2)-(a3).

In another embodiment, the method further comprises: before the sub-step (a1), the entire system is purged with nitrogen, so that the oxygen content of the system is lower than 5% (v/v).

In another embodiment, the equipment is a device capable of steam distillation.

In the second aspect of the present invention, provided herein is a device for deeply removing volatile organic compounds (VOC) in polymers, reducing polymer odor, and removing inorganic ash. The device comprises:

a steam stripping tower (2);

a feed valve block (8) located upstream of the steam stripping tower, the feed valve block is connected to the top feed port of the steam stripping tower, and is used to control the entry of the polymer into the steam stripping tower;

a discharge valve block (9) located downstream of the steam stripping tower, the discharge valve block is used to control the flow of the polymer out of the steam stripping tower.

In another embodiment, the reaction equipment also comprises a pre-dehydration tower (1) located upstream of the feed valve block.

In another embodiment, the device also comprises a condenser (6), the inlet of the condenser is connected with the exhaust outlet of the steam stripping tower, and the outlet of the condenser is connected with a condensate tank (7).

In another embodiment, the device also comprises: a circulating water cooling system, the circulating water cooling system is used to quench the polymer discharged from the steam stripping tower; and preferably, the circulating water cooling system comprises:

a heat exchanger (3) located downstream of the discharge valve block, and the heat exchanger is connected to the circulating water tank through a conveying pump (4); and/or a Venturi feeder (5), the first inlet of the Venturi feeder is connected with the discharge valve block, and the second inlet is connected with the heat exchanger.

In another embodiment, the exhaust outlet of the steam stripping tower is connected to the condenser through a blower (10).

In the third aspect of the present invention, provided herein is a method for deeply removing volatile organic compounds (VOC) in polymers, reducing polymer odor, and removing inorganic ash. The method is performed using the device according to the second aspect of the present invention, and the method comprises steps of:

(i) the polymer is passed into the feed valve block (8) and enters the top feed port of the steam stripping tower (2);

(ii) a steam is passed into the steam stripping tower, and heat exchange with the polymer is carried out, so that the operating pressure inside the steam stripping tower corresponds to the saturated vapor pressure;

(iii) the polymer is discharged, which is controlled by the rotary discharge valve block (9);

preferably, before the steps (i)-(iii), the device system is purged with nitrogen to ensure that the oxygen content of the gas phase components in the stripping tower is less than 1%, preferably less than 0.1%, more preferably less than 100 ppm.

In another embodiment, during step (ii), the condensed water is periodically discharged from the bottom of the steam stripping tower.

In another embodiment, the step (ii) and step (iii) are carried out simultaneously, i.e. in the process of step (ii), the rotary discharge valve is controlled to be in an open state to ensure the residence time of the material in the steaming equipment.

In another embodiment, the method further comprises (iv) the polymer is passed into the Venturi feeder (5) to be mixed with condensed water, so that the polymer can be quenched before being transported to the downstream of the device for dehydration process; preferably, the method further comprises a step of: discharging the exhaust through the exhaust outlet of the steam stripping tower.

In another embodiment, before step (i), the method also comprise a step of: adding the polymer to the pre-dehydration tower (1) to carry out the pre-dehydration process.

In another embodiment, after the exhaust gas is discharged, it enters the condenser (6) for condensation, and then enters the condensate tank (7). Preferably, the method further comprises: the non-condensable components in the exhaust is passed into an exhaust treatment system, and then mixed with the steam and passed into the steam stripping tower (2) again.

In another embodiment, the method is performed with following devices:

a micro negative pressure steam stripping tower (302);

a feed valve block (308) located upstream of the micro negative pressure steam stripping tower, the feed valve block is connected to the top feed port of the micro negative pressure steam stripping tower, and used to control the resin to enter the micro pressure steam stripping tower;

a discharge valve block (309) located downstream of the micro negative pressure steam stripping tower, the discharge valve block is used to control the resin to flow out of the micro negative pressure steam stripping tower;

preferably, the device further comprises a pre-dehydration tower (301) located upstream of the feed valve block; and/or a negative pressure blower (307); and/or a condenser (306), the inlet of the condenser is connected with the outlet of the exhaust negative pressure blower of the micro-negative pressure steam stripping tower; and/or a heat exchanger (303) located downstream of the discharge valve block, the heat exchanger is connected to a circulating water tank through a transfer pump (304); and/or a Venturi feeder (305), the first inlet of the Venturi feeder is connected with the discharge valve block, and the second inlet is connected with the heat exchanger.

When the above device is used, the method comprises following steps:

(i) the polymer is passed into the feed valve block (308), and enters the top feed port of the micro negative pressure steam stripping tower (302);

(ii) steam is passed into the water at the bottom of the micro negative pressure steam stripping tower, the temperature in the tower is controlled to generate steam and heat exchange is carried out with the polyethylene or ethylene copolymer, so that the temperature of the polyethylene or ethylene copolymer is controlled at 50-95° C. to remove gas-phase impurity molecules;

(iii) the rotary discharge valve block (309) is operated to discharge the resin;

preferably, the method further comprises following steps:

(iv) the polyethylene or ethylene copolymer is passed into the Venturi feeder (305), mixed with circulating cooling water, so that the polyethylene or ethylene copolymer is quenched;

and preferably, before step (i), the method further comprises a step of passing the resin into the pre-dehydration tower (301) for pre-dehydration.

Preferably, the method further comprises a step of: passing the exhaust gas discharged from the top of the micro-negative pressure steam stripping tower into a negative pressure blower (307), thereby controlling the vacuum degree of the micro-negative pressure steam stripping tower; preferably, the method further comprises a step of: passing the exhaust gas discharged through the negative pressure blower (307) into the condenser (6) for condensation.

In another embodiment, the method is performed with the following devices:

a wet nitrogen stripping tower (202);

a feed valve block (208) located upstream of the wet nitrogen stripping tower, the feed valve block is connected to the top feed port of the wet nitrogen stripping tower, and used to control the resin entering the wet nitrogen stripping tower;

a discharge valve block (209) located downstream of the wet nitrogen stripping tower, the discharge valve block is used to control the resin flowing out of the wet nitrogen stripping tower;

the device further comprises a pre-dehydration tower (201) located upstream of the feed valve block; the device further comprises a condenser (206), the inlet of the condenser is connected with the exhaust outlet of the wet nitrogen stripping tower, and the outlet of the condenser is connected with the condensate tank (207); preferably, the device further comprises a nitrogen heater (211), the nitrogen heater is located upstream of the condenser, and is used to heat and reuse the exhaust gas discharged from the exhaust outlet of the wet nitrogen stripping tower; the device also comprises a circulating water cooling system, the circulating water cooling system is used to quench the PE resin discharged from the wet nitrogen stripping tower; preferably, the circulating water cooling system comprises:

(i) a heat exchanger (203) located downstream of the discharge valve block, the heat exchanger is connected to a circulating water tank through a transfer pump (204);

(ii) a Venturi feeder (205), the first inlet of the Venturi feeder is connected with the discharge valve block, and the second inlet is connected with the heat exchanger.

When the above device is used, the method comprises following steps of:

(1) passing a resin crude product into the top feed port of a wet nitrogen stripping tower (202) through a feeding valve block (208);

(2) passing a wet nitrogen into the wet nitrogen stripping tower to exchange heat with the crude resin product, and the crude resin product is heated to 50-95° C., so that the VOC in the resin is desorbed;

(3) discharging the crude resin product through the control of the rotary discharge valve block (209).

preferably, the method further comprises a step of: (4) passing the crude resin product into the Venturi feeder (205) to be mixed with condensed water, thereby quenching the resin and then transporting it to the downstream of the device for centrifugal dehydration process.

More preferably, the method further comprises a step of: discharging the exhaust gas through the exhaust outlet of the wet nitrogen stripping tower; preferably, after the exhaust gas is discharged, it enters the condenser (206) for condensation, and then enters the condensate tank (207).

When the above device is used, the method is performed with following devices:

a feed buffer tank (401), the feed buffer tank is used for temporarily storing polymer materials, from which the VOC needs to be removed and the odor needs to be reduced;

a horizontal rotary furnace component; the horizontal rotary furnace component is located downstream of the feed buffer tank, and comprises a first horizontal rotary furnace (402) and a second horizontal rotary furnace (403), and the horizontal rotary furnace component is a cascaded structure; the first horizontal rotary furnace and the second horizontal rotary furnace respectively have a material inlet, a steam inlet valve and a exhaust discharge valve;

preferably, the device also comprises:

a flash evaporation tank (407); the flash evaporation tank is used for storing supplementary fresh water and flash evaporating, thereby preparing supplementary clean steam; the first heat exchanger (E-101) and the second heat exchanger (E-102); the first heat exchanger and the second heat exchanger are used for exchanging heat and cooling the periodic blow down steam, and exchanging heat for the supplementary fresh water to increase its temperature;

a water pump (P-101), the water pump is used to drive the supplementary fresh water inside the flash evaporation tank into the heat exchanger;

preferably, the device further comprises a steam compressor (406), which is used for pressurizing the steam in the flash evaporation tank; preferably, the device further comprises a drying equipment, the drying equipment comprises a particle centrifugal dehydrator (404) and a vibratory screen (405) for drying the devolatilized product.

In another embodiment, the method comprises following steps:

(1) the polymer, from which VOC needs to be removed and/or the odor needs to be reduced, is added into the feed buffer tank (401), the first horizontal rotary furnace (402) and the second horizontal rotary furnace (403) are run, and a steam is continuously injected into the horizontal rotary furnace component, while the material inlet is opened for feeding;

(2) the polymer is kept in the horizontal rotary furnace component, so that an azeotrope is formed from the VOC and steam, and then the exhaust gas discharge valve is opened to discharge the azeotrope from the horizontal rotary furnace component;

preferably, after the step (2), the method also comprises: passing the discharged azeotrope into the first heat exchanger (E-101) for heat exchange, so that the temperature is lowered to 80° C.-90° C., and then passing it into the second heat exchanger for secondary heat exchange, so that the temperature is finally reduced to 40° C.-55° C.;

preferably, the method further comprises following steps:

the external supplementary fresh water first is passed through the second heat exchanger (E-102) for heat exchange, and then is transported into the flash evaporation tank (407), the supplementary fresh water inside the flash evaporation tank is passed through the circulating pump and is pumped into the first heat exchanger (E-101) for heat exchange, and the temperature is raised to 100 to 105° C.; finally, the supplementary fresh water re-enters the flash evaporation tank for flash evaporation, and the gas phase part is pressurized by the steam compressor, so that the steam temperature is raised to 110-120° C.;

preferably, the method also comprises: the polymer is dried after being discharged from the horizontal rotary furnace.

In another embodiment, steam distillation can be used to remove VOC from the polymer, reduce the odor of the polymer, and reduce the ash content of the polymer.

It should be understood that, within the scope of the present invention, the technical features mentioned above of the present invention and the technical features specifically described below, e.g., in the examples, can be combined with each other to form new or preferred technical solutions. Due to the limited pages, they are not described here.

DETAILED DESCRIPTION OF THE INVENTION

Figure 1:
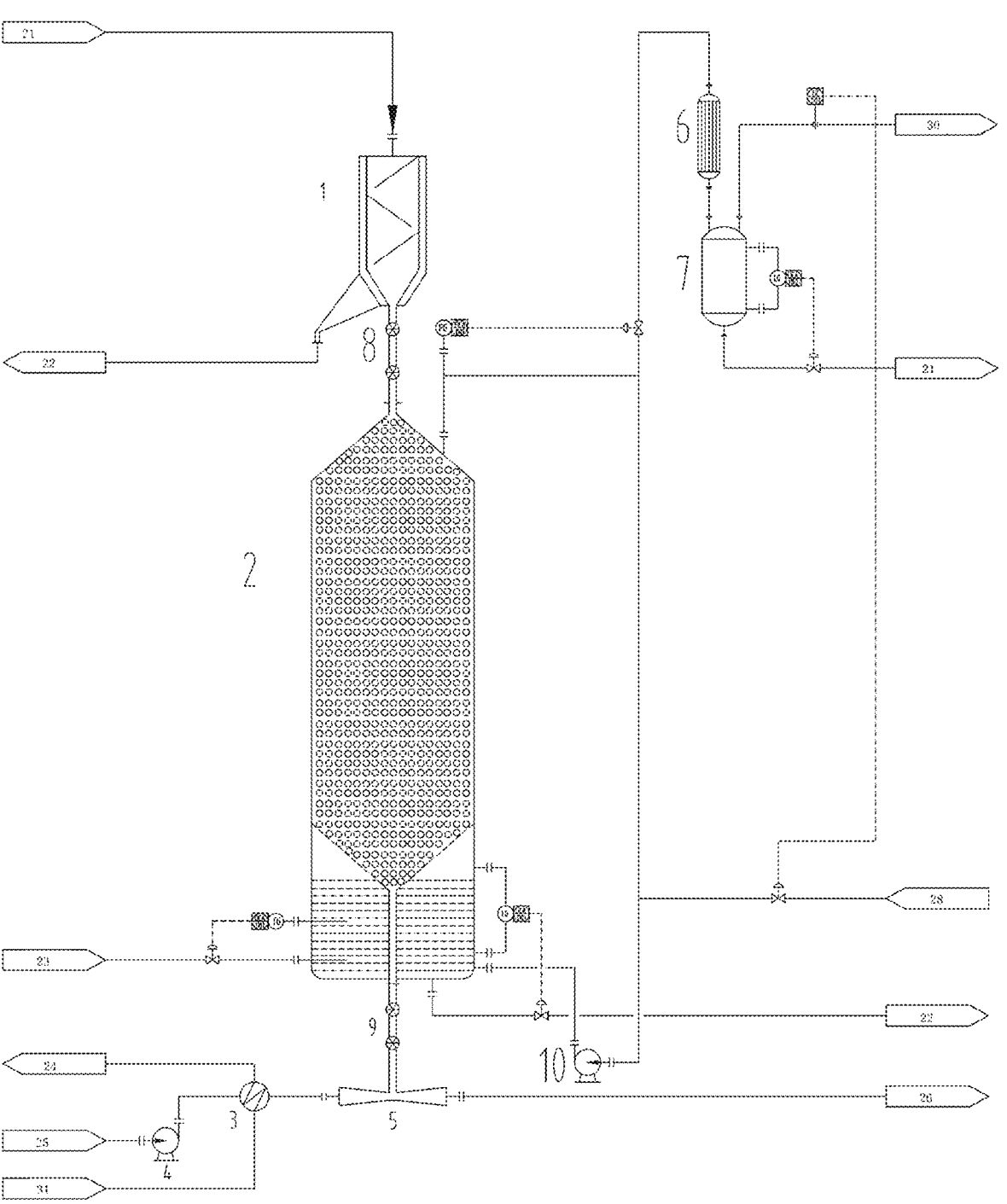
FIG. 1 is a schematic structural diagram of a device for removing VOC from a polymer, preferably polypropylene, and reducing odor levels in on example of the present invention; wherein, 1—pre-dehydrator, 2—steam stripping tower, 3—heat exchanger, 4—transfer pump, 5—Venturi feeder, 6—condenser, 7—condensate tank, 8—rotary feed valve block, 9—rotary discharge valve block, 10—blower.

After long-term and in-depth research, the inventors of the present invention provided a method for deeply removing VOCs in polymer resins, reducing odor levels, and removing inorganic ash, and also provided a device for realizing the purpose.

According to the method, the VOC encapsulated in the polymer resin and the organic volatiles causing severe odor fully migrate and diffuse by continuously contacting the water vapor with the polymer, and form an azeotrope with the water vapor, thereby achieving deep removal. The method can also promote the inorganic salts (such as ash) encapsulated in the resin fully dissolve in the water vapor to achieve the effect of deashing. At the same time, the present invention also provided a device that can achieve said effect.

The working principle of the method and device provided herein is to take advantage of the characteristics that the movement of the chain segments of the resin can be intensified within a certain temperature range without destroying the original particle physical shape of the resin and without caking, so as to accelerate the diffusion and migration of VOC components in the resin, and at the same time, the VOC components are removed with steam stripping. The process utilizes steam distillation to achieve deep removal of residual VOCs in the resin. Based on the above findings, the inventors have completed the present invention.

Method for Removing Resin VOC and Reducing Odor Level

In order to overcome the shortcomings of the existing technology, reduce the VOC content of resin products in the existing production equipment, reduce the odor level, improve product quality, and reduce the VOC emission problem in the packaging process of the production equipment, the present invention provided a method for efficiently removing polymer impurities, such as VOC, polymer odor, inorganic salts and other impurities. The principle is to keep the resin at a certain temperature for a certain period of time, so that the low-molecular VOC, odor molecules and inorganic salts (e.g. ash) encapsulated in the polymer resin can be fully migrated and diffused, and then removed by stripping.

The method of the present invention comprises following steps: the polymer material is continuously contacted with water vapor at 100-200° C. for 0.5-6 hours, and the organics in the polymer enter the gas phase or liquid phase, thereby reducing the VOC (high boiling point or low vapor pressure organic matter) content in the polymer and odor level.

In a preferred embodiment, the VOC in the polymer can be reduced to a minimum of 1 ppm; the odor level can reach 3.0, so as to meet the requirements of medical grade or electronic grade resin.

The method can reduce the inorganic ash content in the polymer as well as removing VOC and odor level, thereby achieving the effect of polymer deashing. In a preferred embodiment, after the removal step, the ash content in the polymer can be reduced by more than 20% on the basis of the original ash content, and can be as low as 0.011%; more preferably, direct contact of steam/water/polymer can achieve better results. As the water vapor is continuously contacted with the polymer at 100-200 degrees Celsius for 0.5-6 hours, the inorganic substances in the polymer are extracted into the aqueous phase. Better deashing effect, e.g. 50 ppm, can be achieved when water vapor and water in phase equilibrium are used in contact with the polymer.

The method of the present invention can effectively reduce the VOC in the polymer. Preferably, during the treatment process of the method of the present invention, the reaction system is isolated from air or oxygen. The isolation of air or isolation of oxygen means that the oxygen content of the system in the complete removal process is lower than 5%; in particular, before using this method, the system is first purged with an inert gas or steam to replace the air in the system, so that better results can be achieved; and in a preferred embodiment, the oxygen content of the gas phase components is less than 1%; more preferably, less than 0.1%; most preferably, less than 100 ppm.

In order to obtain a better effect, the steam or condensed water is discharged while the removal step is carried out, wherein the steam or condensed water is discharged at a rate of 1-200 Kg steam/ton polymer/hour. At the same time, the same amount of water vapor was introduced to maintain the pressure and water vapor temperature in the system.

In order to ensure the effect of deep removal, the speed of said steam discharge is preferably 1200 Kg water vapor/ton polymer/hour; for better economy, preferably 1~100 Kg water vapor/ton polymer/hour; and in another preferred embodiment, 5~50 Kg steam/ton polymer/hour will be more preferable, and 5~25 Kg steam/ton polymer/hour will be the most preferable.

In a preferred embodiment, the condensed water removal can be performed intermittently or continuously.

The form of the polymer is not specifically limited, which can be powder or pellet. In a preferred embodiment, it can be a prefabricated polymer product.

The polymer can be of various types, for example, in a preferred embodiment, the polymer is polyethylene (PE), polypropylene (PP), polybutene PB-1, acrylonitrile/butadiene/styrene terpolymer (ABS), olefin block copolymer (OBC), nylon (PA), polycarbonate (PC), polyethylene terephthalate (PET), polybutylene terephthalate (PBT), ethylene propylene rubber, polystyrene or polyphenylene sulfide.

In a preferred embodiment of the present invention, the polymers are polypropylene (PP) and polypropylene-random PPR.

In a preferred embodiment of the present invention, the polymer may be a modified polymer or an article of the polymer.

In a preferred embodiment of the present invention, the melt flow index range of the polypropylene (PP) or polypropylene-random PPR is 0.1-2000 g/10 min (measured with the method of GB/T 2682-2000).

In a preferred embodiment of the present invention, the polypropylene (PP) is a resin used for medical grade, automotive interior special or food contacting applications; and in particular, a melt-blown resin, a special resin for syringes or a special resin for protective equipment.

In a preferred embodiment of the present invention, the polypropylene (PP) is a special resin for electronic and electrical components.

In a preferred embodiment of the present invention, the polyethylene is ultra-high molecular weight polyethylene UHMWPE and cross-linked polyethylene PEX.

During the reaction process of the present invention, the water vapor can be high-pressure water vapor or low-pressure water vapor; i.e., the temperature of the water vapor can be selected according to the melting point of the polymer; preferably, the temperature of the steam is 100° C.-200° C., and 20-50° C. lower than the melting point of the polymer to be treated; and for better effects, preferably, the temperature of the steam is 100° C.-200° C., and 20-30° C. lower than the melting point of the polymer to be treated.

In an embodiment of the present invention, the temperature of the saturated steam can be controlled by the pressure of the steam; the corresponding relationship between the temperature and pressure of saturated steam is well known to those skilled in the art, and a suitable pressure can be selected with reference to the table of saturated steam temperature vs pressure.

In the method, the saturated steam can be used to contact the material directly, so that the polymer is heated to the temperature corresponding to the saturated steam. During this process, the material is not preheated.

The contact time and contact temperature can be determined according to the type of materials actually processed. Preferably:

when the particle diameter of the polymer is <1 mm and the VOC content in the polymer is <2000 ppm, the time that the polymer is kept at the temperature corresponding to saturated water vapor is 0.5-3 h, more preferably 0.5-2 h;

when the particle diameter of the polymer is <1 mm and the VOC content in the polymer is ≥2000 ppm, the time that the polymer is kept at the temperature corresponding to saturated water vapor is 1-5 h, more preferably 1-3 h for better effects;

when the particle diameter of the polymer is ≥1 mm and the VOC content in the polymer is <1000 ppm, the time that the polymer is kept at the temperature corresponding to saturated water vapor is 1-5 h, more preferably 2-4 h for better effects;

when the particle diameter of the polymer is ≥1 mm and the VOC content in the polymer is ≥1000 ppm, the time that the polymer is kept at the temperature corresponding to saturated water vapor is 3-7 h, more preferably 3-5 h, more preferably 3-4 h for better effects.

In a preferred embodiment of the present invention, the method may comprise the following sub-steps:

(a1) the polymer material is loaded in the reaction equipment, preferably, the equipment is a vertical or horizontal equipment;

(a2) the water vapor is passed through the interior of the reaction equipment in step (a1), continuously and directly contacting the polymer for 0.5-6 hours in a phase equilibrium state, while the water vapor is discharged after contacting the polymer;

(a3) the polymer material is dehydrated and dried;

(a4) the polymer material dehydrated and dried in step (a3) is discharged and collected.

Wherein, before step (1), the polymer can be preheated or not; in step (a1), the polymer can be added to the equipment in batches, and steps (a2)-(a4) can be carried out, thereby implementing intermittent operation; step (1)-(4) can be carried out continuously, thereby implementing continuous operation and achieving said effects; wherein the continuous operation refers to that the polymer is continuously loaded in the equipment, and after steps (2)-(3), is continuously discharged and collected in operation (4); and preferably, in order to ensure that the organic volatiles with high boiling point or low saturated vapor pressure in the polymer are fully removed, it is necessary to ensure that the contact time between water vapor and the polymer is not less than 0.5 hours.

The method of the present application is preferably carried out in the absence of air or oxygen. Therefore, in a preferred embodiment, the operation further comprises purging the entire system with nitrogen gas before performing the operation (1) to ensure that the oxygen content of the system is less than 5%.

In another preferred embodiment, in the reaction process, the temperature of the system is 100-200° C.

The device used in the method of the present invention is not specifically limited, and any device that can realize steam distillation can realize the removal of volatile organic compounds (VOC) in the polymer.

Gas Removal Device for Polypropylene

An application example of the method of the present invention is a gas removal device for polypropylene. In a preferred embodiment, the used device comprises:

A steam stripping tower (2);

A feed valve block (8) located upstream of the steam stripping tower, the feed valve block is connected to the top feed port of the steam stripping tower, and is used to control the entry of the polymer into the steam stripping tower;

A discharge valve block (9) located downstream of the steam stripping tower, the discharge valve block is used to control the flow of the polymer out of the steam stripping tower.

In another preferred example, the device also comprises a pre-dehydration tower (1) located upstream of the feed valve block.

In another preferred example, the device also comprises a condenser (6), the inlet of the condenser is connected with the exhaust outlet of the steam stripping tower, and the outlet of the condenser is connected with the condensate tank (7).

In another preferred example, the device also comprises: a circulating water cooling system, the circulating water cooling system is used to quench the polymer discharged from the steam stripping tower; and preferably, the circulating water cooling system comprises:

a heat exchanger (3) located downstream of the discharge valve block, and the heat exchanger is connected to the circulating water tank through a conveying pump (4); and/or a Venturi feeder (5), the first inlet of the Venturi feeder is connected with the discharge valve block, and the second inlet is connected with the heat exchanger.

In another preferred example, the exhaust outlet of the steam stripping tower is connected to the condenser through a blower (10).

When the above device is used as the removal device, the method for removing volatile organic compounds (VOC) from the polymer and reducing the odor level comprises steps of:

(i) passing the polymer into the feed valve block (8) and into the top feed port of the steam stripping tower (2);

(ii) passing the steam into the steam stripping tower for heat exchange with the polymer, so that the operating pressure inside the steam stripping tower corresponds to the saturated vapor pressure;

(iii) discharging the polymer, which is controlled by the rotary discharge valve block (9);

preferably, before the steps (i)-(iii), the device system is purged with nitrogen to ensure that the oxygen content of the gas phase components in the stripping tower is less than 1%, preferably less than 0.1%, and more preferably less than 100 ppm.

In another preferred example, the method also comprises:

(iv) passing the polymer into the Venturi feeder (5) to be mixed with condensed water, thereby quenching the polymer before being transported to the downstream of the device for dehydration process; and preferably, the method further comprises a step of: discharging the exhaust through the exhaust outlet of the steam stripping tower.

In another preferred example, before step (i), the method also comprises a step of: adding the polymer to the pre-dehydration tower (1) to carry out the pre-dehydration process.

In another preferred example, after the exhaust gas is discharged, it enters the condenser (6) for condensation, and then enters the condensate tank (7). Preferably, the method further comprises: the non-condensable components in the exhaust is passed into an exhaust treatment system, and then mixed with the steam and passed into the steam stripping tower (2) again.

The described method can achieve continuously contacting polypropylene with water vapor for 0.5-6 hours at 100-200° C., thereby reducing the VOC of polypropylene as low as 1 ppm, and the ash content be as low as 50 ppm, and reach an odor level of 3.0, which meets the requirements for medical grade or electronic grade resin Gas Removal Device for Polyethylene An application example of the method of the present invention is a gas removal device for polyethylene. In a preferred embodiment, the device comprises:

A wet nitrogen stripping tower (2);

A feed valve block (8) located upstream of the wet nitrogen stripping tower, the feed valve block is connected to the top feed port of the wet nitrogen stripping tower, and is used to control the resin entering the wet nitrogen stripping tower;

A discharge valve block (9) located downstream of the wet nitrogen stripping tower, the discharge valve block is used to control the resin flowing out of the wet nitrogen stripping tower.

In another preferred example, the wet nitrogen stripping tower is a tower in which the mode of accumulation and flow of materials in the tower is a dense phase moving bed structure.

In another preferred example, the wet nitrogen stripping tower is a tower with a built-in hot water collection device at the bottom.

In another preferred example, in the wet nitrogen stripping tower, hot nitrogen is aerated from the bottom of the tower to generate wet nitrogen.

In another preferred example, the device includes an external wet nitrogen generating device, and after the wet nitrogen is generated in the wet nitrogen generating device, it is passed into the wet nitrogen stripping tower to contact the material.

In another preferred example, the feed valve block is a rotary feed valve block.

In another preferred example, the discharge valve block is a rotary discharge valve block.

In another preferred example, the rotary feed valve block is a combination of two or more rotary trippers.

In another preferred example, the rotary discharge valve block is a combination of two or more rotary trippers.

In another preferred example, the rotary tripper is in the form of a gravity flap valve or a wing valve.

In another preferred example, the upstream refers to the upstream of the flow direction of the PE resin.

In another preferred example, the wet nitrogen stripping tower further comprises a steam rising perforated plate placed in the tower body of the stripping tower.

In another preferred example, the device further comprises a pre-dehydration tower (1) located upstream of the feed valve block.

In another preferred example, the pre-dehydration tower is a pre-dehydration tower of the existing structure of the original PE device.

In another preferred example, the pre-dehydration tower is a centrifugal dehydration tower.

In another preferred example, the device further comprises a condenser (6), the inlet of the condenser is connected with the exhaust outlet of the wet nitrogen stripping tower, and the outlet of the condenser is connected with the condensate tank (7).

In another preferred example, the device further comprises a circulating water cooling system, and the circulating water cooling system is used to quench the PE resin discharged from the wet nitrogen stripping tower.

In another preferred example, the circulating water delivery device comprises:

a heat exchanger (3) located downstream of the discharge valve block, and the heat exchanger is connected to the circulating water tank through a conveying pump (4);

a Venturi feeder (5), the first inlet of the Venturi feeder is connected with the discharge valve block, and the second inlet is connected with the heat exchanger.

In another preferred example, the exhaust outlet of the wet nitrogen stripping tower is connected to the condenser through a blower (10).

In another preferred example, the blower is a centrifugal blower or a Roots blower.

In another preferred example, the device further comprises a nitrogen heater (11). The nitrogen heater is located upstream of the condenser, and is used to heat and reuse the exhaust gas discharged from the exhaust outlet of the wet nitrogen stripping tower.

In the second aspect of the present invention, provided herein is a method for removing VOC from polymer and reducing odor level, comprising steps of:

(1) passing the polymer into the feed valve block (8) and into the top feed port of the wet nitrogen stripping tower (2);

(2) passing a steam into the wet nitrogen stripping tower for heat exchange with the polymer, so that the resin is heated to 50-95° C., and the VOC molecules in the resin can be resolved;

(3) discharging the polymer, which is controlled by the rotary discharge valve block (9).

In another preferred example, the wet nitrogen is a saturated wet nitrogen, i.e., the content of water vapor in the nitrogen corresponds to the saturated partial pressure of water vapor at the temperature to which the resin needs to be heated.

In another preferred example, the wet nitrogen is an unsaturated wet nitrogen.

In another preferred example, the wet nitrogen is a pure hot nitrogen.

In another preferred example, in the step (2), the resin is heated to 70-95° C., more preferably 80-90° C.

In another preferred example, in the step (2), the resin stays in the wet nitrogen stripping tower for 0.5 to 5 hours, preferably 1 to 2 hours.

In another preferred example, the method further comprises a step of: (4) passing the resin into the Venturi feeder (5) to be mixed with condensed water, thereby quenching the resin and then transporting it to the centrifugal dehydration process at downstream of the device.

In another preferred example, the condensed water comes from the conveying circulating water tank, and after being cooled by the heat exchanger (3), it is conveyed by the conveying pump (4) into the Venturi feeder (5).

In another preferred example, the material entering the tower from the top of the tower moves from top to bottom in the tower as a dense phase moving bed.

In another preferred example, in the step (4), the resin is quenched in a Venturi feeder to below 60° C., preferably below 50° C., more preferably below 40° C.

In another preferred example, the step (4) further comprises: the treated resin is first collected in a silo, then cooled with nitrogen and then transported to the subsequent process.

In another preferred example, the step (4) further comprises: further cooling the treated resin with other cooling facilities.

In another preferred example, other cooling facilities are selected from converter equipment with cooling coils, or stirring equipment with cooling devices.

In another preferred example, before step (1), the method further comprises a step: the resin is fed into the pre-dehydration tower 1, and the pre-dehydration step is performed.

In another preferred example, after the pre-dehydration step, the water content of the resin is 1-10 wt %, preferably 1-5 wt %.

In another preferred example, the resin is a mixture of resin and water from the underwater pelletizing process of the PE device.

In another preferred example, after the pre-dehydration step is completed, the removed water is returned to the underwater pelletizing process.

In another preferred example, the method further comprises a step of: discharging the exhaust gas through the exhaust outlet of the wet nitrogen stripping tower.

In another preferred example, after the exhaust gas is discharged, it enters the condenser (6) for condensation, and then enters the condensate tank (7).

In another preferred example, the method further comprises: the non-condensable components in the exhaust gas are passed into the exhaust treatment gas system, and then mixed with the supplemented fresh nitrogen, heated by the nitrogen heater (11) and after being heated by the nitrogen heater (11), it is re-introduced into the wet nitrogen stripping tower (2).

In another preferred example, the non-condensable component is periodically blown down. Preferably, the amount of the periodic blowing down is determined according to the VOC content in the nitrogen after condensation.

In another preferred example, the circulating nitrogen gas is heated to 50-95° C. by a steam, preferably 70-95° C., and more preferably 80-90° C.

In another preferred example, in steps (1)-(3), the oxygen content of the gas phase components in the stripping tower is less than 1%, preferably less than 0.1%, and more preferably less than 100 ppm.

Micro Negative Pressure Gas Removal Device for Polyethylene

According to another embodiment of the present invention, gas removal for polyethylene is performed under slightly negative pressure conditions. In this regard, the inventors have designed a device for removing gas-phase impurities in polyethylene or ethylene copolymer, and the device comprises:

A micro negative pressure steam stripping tower (302);

A feed valve block (308) located upstream of the micro negative pressure steam stripping tower, the feed valve block is connected to the top feed port of the micro negative pressure steam stripping tower, and used to control the resin to enter the micro pressure steam stripping tower;

A discharge valve block (309) located downstream of the micro negative pressure steam stripping tower, the discharge valve block is used to control the resin to flow out of the micro negative pressure steam stripping tower.

In another preferred example, the micro negative pressure steam stripping tower is a tower in which the mode of accumulation and flow of materials in the tower is a dense phase moving bed structure.

In another preferred example, the micro negative pressure steam stripping tower is a tower with a built-in hot water generator at the bottom, the steam is passed into a water pan at the bottom of the tower, and the temperature of the water pan is controllable.

In another preferred example, the device further comprises an external hot water inlet located at the bottom of the tower, and the external hot water inlet is used for adding external hot water of a certain temperature to the bottom of the tower through a pump.

The feed valve block is a rotary feed valve block, i.e. the combination of two or more rotary trippers; and the discharge valve block is a rotary discharge valve block, i.e. the combination of two or more rotary trippers.

In another preferred example, the rotary tripper is in the form of a gravity flap valve or a wing valve.

In another preferred example, the upstream refers to the upstream of the flow direction of the resin, including the resin delivered by the pelletizing system on the production device, and the commercially available resin that is purchased and added to the device.

In another preferred example, the micro negative pressure steam stripping tower further comprises a steam rising perforated plate placed in the tower body of the stripping tower, and/or a nitrogen inlet at the bottom of the tower.

In another preferred example, the device further comprises a pre-dehydration tower (301) located upstream of the feed valve block.

In another preferred example, the pre-dehydration tower is a pre-dehydration tower of the existing structure of the original PE device; and preferably, the pre-dehydration tower is a centrifugal dehydration tower.

In another preferred example, the device further comprises a negative pressure blower, which is connected to the exhaust outlet at the top of the micro negative pressure steam stripping tower, and is used to control the vacuum degree in the tower.

In another preferred example, the device further comprises a condenser (306), and the inlet of the condenser is connected with the exhaust outlet of the negative pressure blower of the micro negative pressure steam stripping tower. The condensate at the outlet of the condenser is collected and sent to the whole plant sewage treatment system or returned to the underwater pelletizing system. The non-condensable gas at the outlet of the condenser is sent to the exhaust gas treatment system.

In another preferred example, the liquid phase outlet end of the condenser is connected with a sewage treatment system, or with an underwater pelletizing system, or with an exhaust gas treatment system.

In another preferred example, the device further comprises a circulating water cooling system, and the circulating water cooling system is used to quench the resin discharged from the micro negative pressure stripping tower.

In another preferred example, the circulating water delivery device comprises:

a heat exchanger (303) located downstream of the discharge valve block, and the heat exchanger is connected to the circulating water tank through a conveying pump (304);

a Venturi feeder (305), the first inlet of the Venturi feeder is connected with the discharge valve block, and the second inlet is connected with the heat exchanger.

In another preferred example, the circulating water cooling and conveying system can also be replaced by the following method: the material from the discharge valve block (309) first enters a buffer tank with a stirring means, and then the mixture of water and material is transported to the downstream process by the conveying pump. Preferably, the mode of Venturi cooling and conveying is adopted.

In another preferred example, the Venturi feeder (305) can also be replaced by a stirring tank, and the conveying pump is located below the stirring tank to convey the quenched mixture of water and material to the downstream centrifugal dehydration process.

In another preferred example, the circulating water cooling and conveying system includes:

a buffer tank;

a conveying pump connected to the buffer tank.

In another preferred example, the material from the discharge valve group (309) is conveyed into a buffer tank with a stirring means, and then the mixture of water and material is conveyed to the downstream process by the conveying pump.

In another preferred example, the exhaust outlet of the micro negative pressure stripping tower is connected to the condenser through a negative pressure blower (307).

In another preferred example, the negative pressure blower is a centrifugal blower or a Roots blower.

When the above device is used as the removal device, the method for removing volatile organic compounds (VOC) from a polymer and reducing odor level comprises steps of:

(i) passing polyethylene or ethylene copolymer into the feed valve block (308) and into the top feed port of the micro negative pressure stripping tower (2);

(ii) passing a steam into the water at the bottom of the micro negative pressure steam stripper, controlling the temperature in the tower to generate water vapor for heat exchange with the polyethylene or ethylene copolymer, so that the temperature of the polyethylene or ethylene copolymer is kept at 50-95° C. to remove gas-phase impurities;

(iii) rotating the discharge valve block (309) to discharge the resin.

In another preferred example, the temperature in the tower corresponds the boiling point temperature of water under the operating pressure in the tower ±5° C.

In another preferred example, the steam is superheated steam, i.e., the temperature and pressure of the steam exceed the saturated steam pressure corresponding to the temperature of the hot water.

In another preferred example, the temperature of the hot water is the corresponding saturation temperature or the corresponding unsaturated temperature under the required vacuum degree in the tower.

In another preferred example, in step (2), the resin is heated to 40-95° C. The specific heating temperature is adjusted with the softening temperature of the material, generally corresponding to the softening temperature of the resin to be heated.

In another preferred example, in step (2), the resin stays in the wet nitrogen stripping tower for 1 to 5 hours, preferably 1 to 3 hours.

In another preferred example, the method further comprises a step of: (iv) passing the resin into the Venturi feeder (5) to be mixed with condensed water, thereby quenching the resin which is then conveyed to the device downstream for centrifugal dehydration process.

In another preferred example, the polyethylene or ethylene copolymer is subjected to centrifugal dehydration after being quenched.

In another preferred example, the polyethylene or ethylene copolymer enters into a stirring tank with water for quenching, and the mixture of resin and water after cooling is transported to the downstream centrifugal dehydration process by a conveying pump.

In another preferred example, the method further comprises a step of: (iv) passing the resin into a stirring tank with water to be mixed with condensed water, thereby quenching the resin, and then conveying it to the downstream centrifugal dehydration process of the device through a pump.

In another preferred example, the condensed water comes from the conveying circulating water tank, and after being cooled by the heat exchanger (303), it is conveyed by conveying pump (304) into the Venturi feeder (5) or the stirring tank.

In another preferred example, the material entering the tower from the top of the tower moves from top to bottom in the tower as a dense phase moving bed.

In another preferred example, in the step (4), the resin is quenched in a Venturi feeder or a stirring tank to below 60° C., preferably below 50° C., more preferably below 40° C.

In another preferred example, the step (iv) further comprises: the treated resin is first collected in a silo, cooled with nitrogen and then transported to the subsequent process.

In another preferred example, the step (4) further comprises: further cooling the treated resin with other cooling facilities.

In another preferred example, other cooling facilities are selected from converter equipment with cooling coils, or stirring equipment with cooling devices.

In another preferred example, before step (1), the method further comprises a step of: feeding the resin into the pre-dehydration tower (301) for the pre-dehydration step.

In another preferred example, after the pre-dehydration step, the water content of the resin is 1-10 wt %, preferably 1-5 wt %.

In another preferred example, the resin is a mixture of resin and water from the underwater pelletizing process of the polyethylene or ethylene copolymer device.

In another preferred example, after the pre-dehydration step is completed, the removed water is returned to the underwater pelletizing process.

In another preferred example, the method further comprises a step of: conveying the exhaust gas discharged through the exhaust outlet on the top of the micro negative pressure stripping tower into the negative pressure blower (7), thereby controlling the vacuum degree of the micro negative pressure stripping tower; preferably, the exhaust gas discharged through the negative pressure blower (7) enters the condenser (6) for condensation.

In another preferred example, after the condensation step is completed, the condensed water is passed into the underwater pelletizing system or the sewage treatment system, and the non-condensable gas is passed into the exhaust gas treatment system.

In another preferred example, in steps (1)-(3), the oxygen content of the gas phase components in the stripping tower is less than 1%, preferably less than 0.1%, and more preferably less than 100 ppm.

The device and method provided by the present invention are suitable for polyethylene or ethylene copolymer, especially LDPE, LLDPE, POE and OBC; and better results can be achieved for low melting point LDPE, POE and OBC. In another preferred example, the polyethylene or ethylene copolymer is selected from the group consisting of LDPE, LLDPE, POE and OBC; more preferably LDPE, POE and OBC; most preferably LDPE.

Removal Device for Ethylene Propylene Rubber

Another embodiment of the present invention is VOC removal and odor removal for ethylene propylene rubber. In this regard, the inventors have designed a device for removing volatile organic compounds (VOC) from a polymer, and the device comprises:

a feed buffer tank (401), the feed buffer tank is used for temporarily storing polymer materials for which the VOC needs to be removed and the odor needs to be reduced;

a horizontal rotary furnace component; the horizontal rotary furnace component is located downstream of the feed buffer tank, and comprises a first horizontal rotary furnace (402) and a second horizontal rotary furnace (403), and the horizontal rotary furnace component is a cascaded structure; the first horizontal rotary furnace and the second horizontal rotary furnace respectively have a material inlet, a steam inlet valve and a exhaust discharge valve;

and the polymer is selected from the group consisting of ethylene propylene monomer (EPM), ethylene propylene rubber (EPDM), low density polyethylene (LDPE), polyolefin elastomers (POE) and olefin block copolymers (OBC).

In another preferred example, the first horizontal rotary furnace and the second horizontal rotary furnace are connected through a pipe; and preferably, a connecting valve is provided on the pipe.

In another preferred example, the polymer is heated to a certain temperature by a saturated steam, and kept for a certain period of time, so that the VOC remaining in the EPDM can be completely resolved and taken out by the steam and condensate.

In another preferred example, the device also comprises:

a flash evaporation tank (407); the flash evaporation tank is used for storing supplementary fresh water and flash evaporating, thereby preparing supplementary clean steam;

the first heat exchanger (E-101) and the second heat exchanger (E-102); the first heat exchanger and the second heat exchanger are used for exchanging heat and cooling the periodic blow down steam, and exchanging heat for the supplementary fresh water to increase its temperature;

and a water pump (P-101), the water pump is used to drive the supplementary fresh water inside the flash evaporation tank into the heat exchanger.

In another preferred example, the water pump drives the supplementary fresh water into the second heat exchanger to heat it, and then drives it into the flash evaporation tank to release heat, thereby complementing the supplementary fresh water by flash evaporation.

In another preferred example, the device further comprises a steam compressor (406), the steam compressor is used for pressurizing the steam in the flash evaporation tank.

In another preferred example, the device further comprises a drying equipment, and the drying equipment comprises a particle centrifugal dehydrator (404) and a vibratory screen (405) for drying the devolatilized product.

In another preferred example, the horizontal rotary furnace further comprises a stirring device, and the stirring device is an impeller rotary stirring device.

In another preferred example, the device is set after the polymer extrusion and pelletizing section; preferably after the ethylene propylene rubber preparation device.

A method for continuously removing volatile organic compounds (VOC) from polymers and reducing odor is provided by using the above device. The method is carried out using the device, and the method comprises steps of:

(1) the polymer, from which the VOC needs to be removed and/or the odor needs to be reduced, is added into the feed buffer tank (401), the first horizontal rotary furnace (402) and the second horizontal rotary furnace (403) is run, and a steam is continuously injected into the horizontal rotary furnace component, while the material inlet is opened for feeding;

(2) the polymer is kept in the horizontal rotary furnace component, so that an azeotrope is formed from the VOC and steam, and then the exhaust gas discharge valve is opened to discharge the azeotrope from the horizontal rotary furnace component;

wherein the polymer is selected from ethylene propylene rubber, low density polyethylene, polyolefin elastomer, or olefin block copolymer.

In another preferred example, the horizontal rotary furnace component is operated continuously or intermittently during step (1).

In another preferred example, during the step (1), the horizontal rotary furnace is operated under pressure, and the operating pressure is equal to the saturated water vapor pressure corresponding to the temperature of the polymer.

In another preferred example, in the step (1), the feeding is maintained and the rotation rate of the motor of the horizontal rotary furnace is adjusted according to the reaction time and speed requirements.

In another preferred example, during the step (2), the temperature in the rotary furnace is 105-120° C., preferably 110-115° C., and more preferably 115-120° C.

In another preferred example, the temperature of the water vapor is 100-120° C.

In another preferred example, in the step (2), the time for keeping the polymer in the horizontal rotary furnace component is 2-3 h, preferably 2.5-3 h.

In another preferred example, the ethylene propylene rubber is newly-produced ethylene propylene rubber.

In another preferred example, the ethylene propylene rubber is a commercially available ethylene propylene rubber.

In another preferred example, in the steps (1) and (2), the stuffing rate of the total volume of water and materials in the horizontal steaming tower is 20%-80%, preferably 30%-70%, and optimally 50%-70%; and/or the volume ratio of the material and water is preferably ≤1:10~1:0.5, more preferably ≤1:5~1:0.5, and the most preferably ≤1:3~1:1.

In another preferred example, after the step (2), the method also comprises: the discharged azeotrope is passed into the first heat exchanger (E-101) for heat exchange, so that the temperature is lowered to 80° C.-90° C., and then it is passed into the second heat exchanger for secondary heat exchange, so that the temperature is finally reduced to 40° C.-55° C.

In another preferred example, the method further comprises following steps: the external supplementary fresh water first is passed through the second heat exchanger (E-102) for heat exchange, and then is transported into the flash evaporation tank (407), the supplementary fresh water inside the flash evaporation tank is passed through the circulating pump and is pumped into the first heat exchanger (E-101) for heat exchange, and the temperature is raised to 100 to 105° C.; finally, the supplementary fresh water re-enters the flash evaporation tank for flash evaporation, and the gas phase part is pressurized by the steam compressor, so that the steam temperature is raised to 110-120° C.

In another preferred example, the liquid-phase water after flash evaporation is returned to the flashing evaporation tank.

In another preferred example, the waste heat recovery and steam generation are achieved through the heat exchange between the supplementary fresh water and the periodic blow down steam as said above.

In another preferred example, the flash evaporation tank is operated at normal pressure.

In another preferred example, in the process of the flash evaporation, the supplementary fresh water is flash-evaporated by the heat released by the steam provided by the first heat exchanger after the steam enters the atmospheric flash evaporation tank, thereby generating a new steam. After that, the steam is pressurized by the compressor, so as to obtain a fresh steam at the same temperature and pressure as the steam inlet.

In another preferred example, the supplementary fresh water does not need to be normally turned on. The water level line inside the flash evaporation tank shall reach the standard when the supplementary fresh water is turned on. After the reaction starts, the supplementary fresh water is switched on and off according to the level gauge of the flash evaporation tank to ensure that the water level inside the flash evaporation tank is appropriate.

In another preferred example, when the steam after flash evaporation is at normal pressure, the steam temperature is 95-105° C.

In another preferred example, the method further comprises: using a compressor to pressurize and raise the temperature of the steam after flash evaporation, so as to ensure that the steam after flash evaporation is at the same pressure and temperature as the steam at the steam inlet.

In another preferred example, the method also comprises the process of waste heat recovery and steam generation. After the end of step (1), the steam carrying VOC and odor components flowing out from the reaction device enters the first heat exchanger for the first heat exchange. Afterwards, it enters the second heat exchanger for the second heat exchange until the temperature is lower than 50° C., and then the oily sewage is transported into the sewage system of the plant area.

In another preferred example, the method further comprises: drying the polymer after being discharged from the horizontal rotary furnace.

In another preferred example, the drying is performed by a particle centrifugal dehydrator and a vibrating screen.

In another preferred example, after dried, the polymer is packaged to obtain the final product.

In another preferred example, the particle drying system is the particle centrifugal dryer and the vibrating screen on the existing EPDM, EPM, POE, and OBC production devices.

In another preferred example, before step (1), a pre-dehydration process is carried out. Preferably, the pre-dehydration process comprises: the water and material mixture from the underwater pelletizing process of the ethylene propylene rubber production device is dehydrated by a pre-dehydration device until the moisture content of the material is ≤70%, preferably ≤50%, more preferably ≤30%.

In another preferred example, the pre-dehydration device is a dehydrator with a strainer structure.

In another preferred example, the pre-dehydration device is a centrifugal dehydration device.

In another preferred example, in step (1), the reaction system is isolated from air or oxygen; preferably, the isolation of air or isolation of oxygen refers to that the oxygen content of the system during the complete removal process is lower than 5% (v/v); preferably, the oxygen content of the system is less than 1% (v/v), more preferably less than 0.1% (v/v), most preferably less than 100 ppm.

In another preferred example, the method further comprises: continuously feeding a water steam into the reaction system while discharging a steam and/or condensed water; preferably, the steam and/or condensed water are discharged at a rate of 1-200 Kg steam/ton polymer/hour; preferably 1-120 Kg steam/ton polymer material/hour; more preferably 5-50 Kg water vapor/ton polymer/hour, most preferably 5-25 Kg water vapor/ton polymer/hour.

In another preferred example, the Mooney viscosity (125° C.) of the ethylene propylene rubber is 10-150M.

In another preferred example, the melt flow index of the polyolefin elastomer is 0.5-40 g/10 min (230° C., 2.16 Kg).

Compared with the prior art, the advantages of the present invention comprise:

(1) After VOC removal is carried out with the method of the present invention, the VOC content in the final packed polymer product is far lower than that of the untreated polymer final product, and the minimum content can be below 1 ppm (tested according to the VDA277 standard). The odor level can usually be as low as 3 level, and the lowest can be lower than 2 level (tested by VW50180), which is far lower than the VOC content and odor level of the same brand of commercial products. For products with an original VOC content of less than ppm, the VOC content and odor level can still be further reduced, therefore, it can be used for the preparation of high-grade polymer raw materials (e.g., medical melt-blown cloth mask raw materials).

(2) The treatment process is simple, i.e., only a set of steam stripping tower and auxiliary facilities need to be added between the two original processes. The layout is small, and the operation and layout of the original device are not affected.

(3) The latent heat of steam is large, the heat transfer efficiency is high, the treatment process is controlled in a suitable temperature range, and the resolution of VOC molecules is fast. Therefore, the treatment efficiency is high, the steam consumption is small, no waste water is generated, the resin quality is not affected, and there is no phenomenon such as agglomeration that affects the operation of the device.

(4) The investment and operational cost of the device are low, and the product quality is highly improved.

The present invention will be further described below in conjunction with specific examples. It should be understood that such examples are only used to illustrate the present invention and not to limit the scope of the present invention. In the following examples, the experimental methods without specific conditions are usually in accordance with conventional conditions, or in accordance with the conditions suggested by the manufacturer. Unless indicated otherwise, percentages and parts are by weight.

EXAMPLES

The operation for removing VOCs in plastics, reducing odor levels, and removing ash by using steam can be an intermittent operation or continuous operation, and the appropriate operation mode is selected according to the working conditions. Different operation modes do not affect the effect of steam treatment.

General Approach: Intermittent Operation

The plastic particles (powder) were added to the steaming device and the system was replaced with nitrogen. After the air was exhausted, a saturated steam at a certain temperature was introduced. The discharge rate of the steam from the steaming device was controlled and the operating pressure of the steaming device was maintained as corresponding to the pressure of the saturated steam. The steaming was carried out for a certain period of time, during which the condensed water was periodically discharged from the bottom of the steaming device. After steaming, the device was evacuated, the material was thoroughly dehydrated, dried and cooled to a certain temperature to obtain a qualified material.

General Approach: Continuous Operation

Plastic particles (powder) were added into the silo at the top of the steaming device. After the air was exhausted, and a saturated steam at a certain temperature was introduced, wherein the speed at which the material enters the steaming device was controlled by the rotary valve. The discharge rate of the steam from the steaming device was controlled and the operating pressure of the steaming device was maintained as corresponding to the pressure of saturated steam. The condensed water was periodically discharged from the bottom of the steaming device. The opening of the discharge valve of the steaming device is controlled to ensure the residence time of the materials in the steaming device. The materials coming out of the steaming device are thoroughly dehydrated, dried and cooled to a certain temperature to obtain qualified materials.

Examples 1-38

The following examples 1-38 were carried out using the equipment shown in FIG. 1. Wherein, examples 1, 32, 33, 34, and 35 were carried out with intermittent operation, and other examples were carried out with continuous operations.

| Example No. | Type of Plastic | Particle Diameter of Plastic (mm) | Steam Usage (Kg/h/t) | Temperature (°C.) | Time (h) | VOC/(μg/g) Raw Material | Product | odor level Raw Material | Product | Ash Raw Material | Product |
|---|---|---|---|---|---|---|---|---|---|---|---|
| 1 | Polypropylene (melt flow index: 1500) | 2~3 | 120 | 115 | 2 | 1862 | 55 | 6.0 | 3.5 | 0.022% | 0.016% |
| 2 | | | 50 | 115 | 3 | | 20 | | 3.0 | | 0.015% |
| 3 | | | 80 | 110 | 2 | | 90 | | 3.7 | | 0.018% |
| 4 | | | 25 | 110 | 3 | | 60 | | 3.5 | | 0.017% |
| 5 | Polypropylene (melt flow index: 30) | 2~3 | 50 | 110 | 2 | 232 | 102 | 4.5 | 3.6 | 0.04% | 0.032% |
| 6 | | | 40 | 110 | 3 | | 75 | | 3.6 | | 0.024% |
| 7 | | | 60 | 120 | 2 | | 52 | | 3.5 | | 0.022% |
| 8 | | | 25 | 120 | 3 | | 23 | | 3.5 | | 0.016% |
| 9 | Polypropylene (melt flow index: 0.3) | 2~3 | 70 | 115 | 2 | 158 | 82 | 4.2 | 3.7 | 0.03% | 0.017% |
| 10 | | | 40 | 115 | 3 | | 63 | | 3.6 | | 0.012% |
| 11 | | | 30 | 125 | 2 | | 34 | | 3.6 | | 0.011% |
| 12 | | | 10 | 125 | 3 | | 11 | | 3.5 | | 0.01% |
| 13 | Polypropylene + 20% POE | 2~3 | 35 | 115 | 2 | 175 | 80 | 4.3 | 4.1 | 3.33% | 1.4% |
| 14 | | | 25 | 115 | 3 | | 56 | | 3.8 | | 1.1% |
| 15 | ABS Plastic 777E | 2~3 | 110 | 105 | 2 | 112 | 34 | 3.8 | 3.3 | 0.33% | 0.17% |
| 16 | | | 90 | 105 | 3 | | 21 | | 3.0 | | 0.12% |
| 17 | ABS Plastic 757 | 2~3 | 120 | 105 | 2 | 118 | 32 | 3.8 | 3.0 | 1.19% | 0.9% |
| 18 | | | 100 | 105 | 3 | | 16 | | 2.8 | | 0.8% |
| 19 | High Viscosity PA6 | 2~3 | 60 | 110 | 2 | 58 | 1.0 | 3.5 | 3.0 | 0.014% | 0.01% |
| 20 | Medium Viscosity PA6 | 2~3 | 50 | 120 | 2 | 26 | 0.2 | 3.5 | 3.0 | 0.011% | <0.01% |
| 21 | Low Viscosity PA6 | 2~3 | 30 | 130 | 2 | 28 | 3.6 | 3.6 | 2.5 | 0.75% | 0.49% |
| 22 | High Viscosity PA66 | 2~3 | 60 | 110 | 2 | 86 | 2.6 | 4.5 | 3.0 | 0.13% | 0.065% |
| 23 | Medium Viscosity PA66 | 2~3 | 30 | 120 | 2 | 67 | 1.3 | 4.4 | 3.0 | 0.056% | <0.01% |
| 24 | Low Viscosity PA66 | 2~3 | 15 | 120 | 2 | 62 | 2.5 | 4.2 | 3.0 | 0.19% | 0.076% |
| 25 | Polycarbonate (PC) | 2~3 | 20 | 150 | 2 | 240 | 20 | 3.6 | 3.0 | 0.1% | 0.02% |
| 26 | Low Viscosity PBT | 2~3 | 110 | 100 | 2 | 286 | 46 | 3.8 | 3.0 | 0.014% | 0.01% |
| 27 | Medium Viscosity PBT | 2~3 | 80 | 100 | 2 | 39 | 11 | 3.8 | 3.0 | 0.058% | 0.032% |
| 28 | High Viscosity PA6PBT | 2~3 | 60 | 100 | 2 | 73 | 12 | 3.7 | 3.0 | 0.017% | 0.011% |
| 29 | Thermoplastic Urethane (TPU) | 2~3 | 40 | 105 | 2 | 69 | 8 | 3.6 | 3.0 | 0.032% | 0.013% |
| 30 | Polyphenylene Oxide (PPO) | 2~3 | 60 | 160 | 2 | 80 | 16 | 3.3 | 3.0 | 0.021% | 0.011% |
| 31 | Polyethylene Terephthalate (PET) | 2~3 | 30 | 110 | 2 | 49 | 12 | 3.6 | 3.0 | 0.048% | 0.017% |
| 32 | Polyphenylene Sulfide (PPS) | 0.1 | 70 | 160 | 3 | 800 | 50 | 6.0 | 4.0 | 0.25% | 0.11% |
| 33 | Polyethersulfone (PES) | 0.1 | 60 | 150 | 2 | 180 | 20 | 3.5 | 3.0 | 0.35% | 0.06% |
| 34 | Polyetheretherketone (PEEK) | 0.1 | 60 | 160 | 3 | 400 | 30 | 3.5 | 3.0 | 1.1% | 0.12% |
| 35 | Polyetheretherketone (PEEK) | 0.1 | 40 | 180 | 3 | | 21 | | | | 0.08% |
| 36 | Ultra-high Molecular Weight Polyethylene (UHMWPE) | 0.1 | 80 | 100 | 1 | 700 | 50 | 5.5 | 3.2 | 0.02% | 0.005% |
| 37 | Polypropylene (melt flow index: 30) | 0.2 | 100 | 110 | 1 | 800 | 40 | 5.5 | 3.5 | 0.023% | 0.016% |
| 38 | Polypropylene (melt flow index: 0.3) | 0.3 | 90 | 120 | 0.5 | 700 | 30 | 5.5 | 3.5 | 0.022% | 0.017% |

Figure 2:
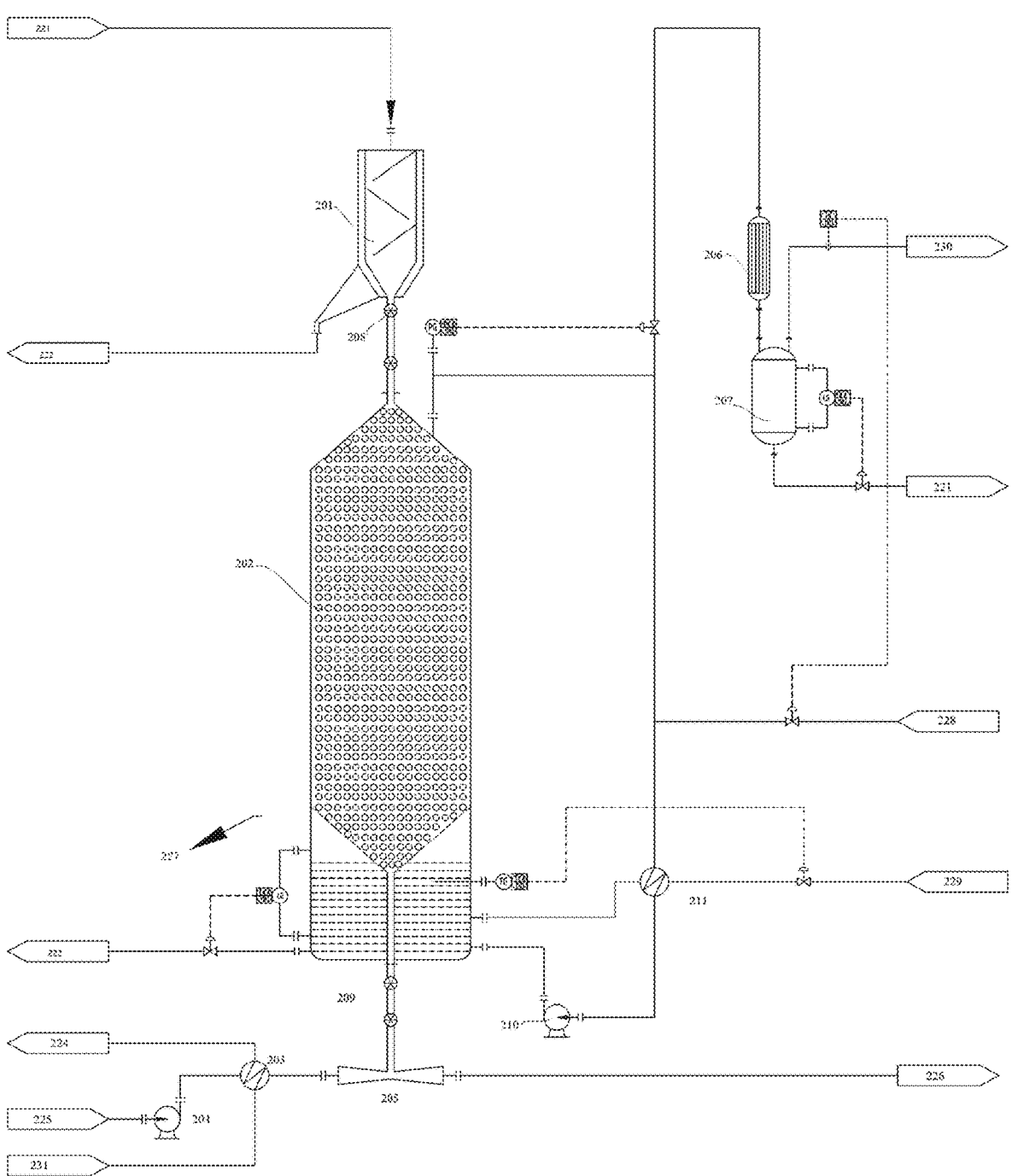
FIG. 2 is a schematic structural diagram of a device for removing VOC from polyethylene, and reducing odor level in one example of the present invention; wherein, 201—pre-dehydrator, 202—wet nitrogen steaming tower, 203—heat exchanger, 204—transfer pump, 205—Venturi feeder, 206—condenser, 207—condensate tank, 208—rotary feed valve block, 209—rotary discharge valve block, 210—blower, 211—nitrogen heater; 221—underwater pelletizing system, 222—underwater pelletizing circulating water tank, 224—CWR (circulating cooling water return), 225—conveying circulation water tank, 226—centrifugal dehydration process, 227—steam rising perforated plate, 228—fresh nitrogen flow, 229—steam flow, 230—exhaust gas treatment system, 231—CWS (circulating cooling water supply).
Figure 3:
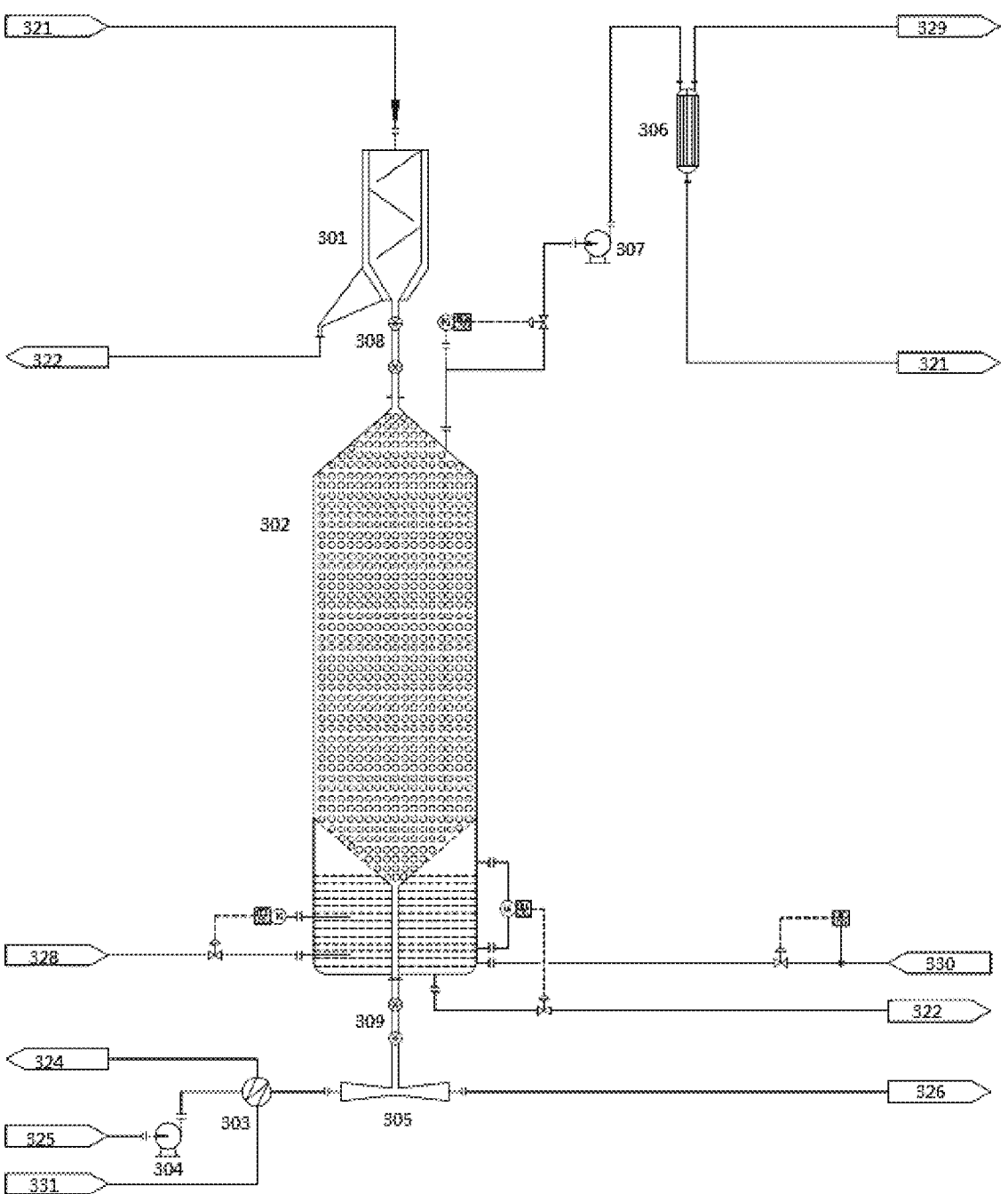
FIG. 3 is a schematic structural diagram of a device for removing VOC from polyethylene, and reducing odor level in a preferred example of the present invention; wherein, 301—pre-dehydrator, 302—micro negative pressure steam stripping tower, 303—heat exchanger, 304—transfer pump, 305—Venturi feeder, 306—condenser, 307—negative pressure blower, 308—rotary feed valve block, 309—rotary discharge valve block; 321—underwater pelletizing system, 322—underwater pelletizing circulating water tank, 324—CWR (circulating cooling water return), 325—conveying circulating water tank, 326—centrifugal dehydration process, 328—steam flow, 329—exhaust gas treatment system, 330—nitrogen flow, 331—CWS (circulating cooling water supply)
Figure 4:
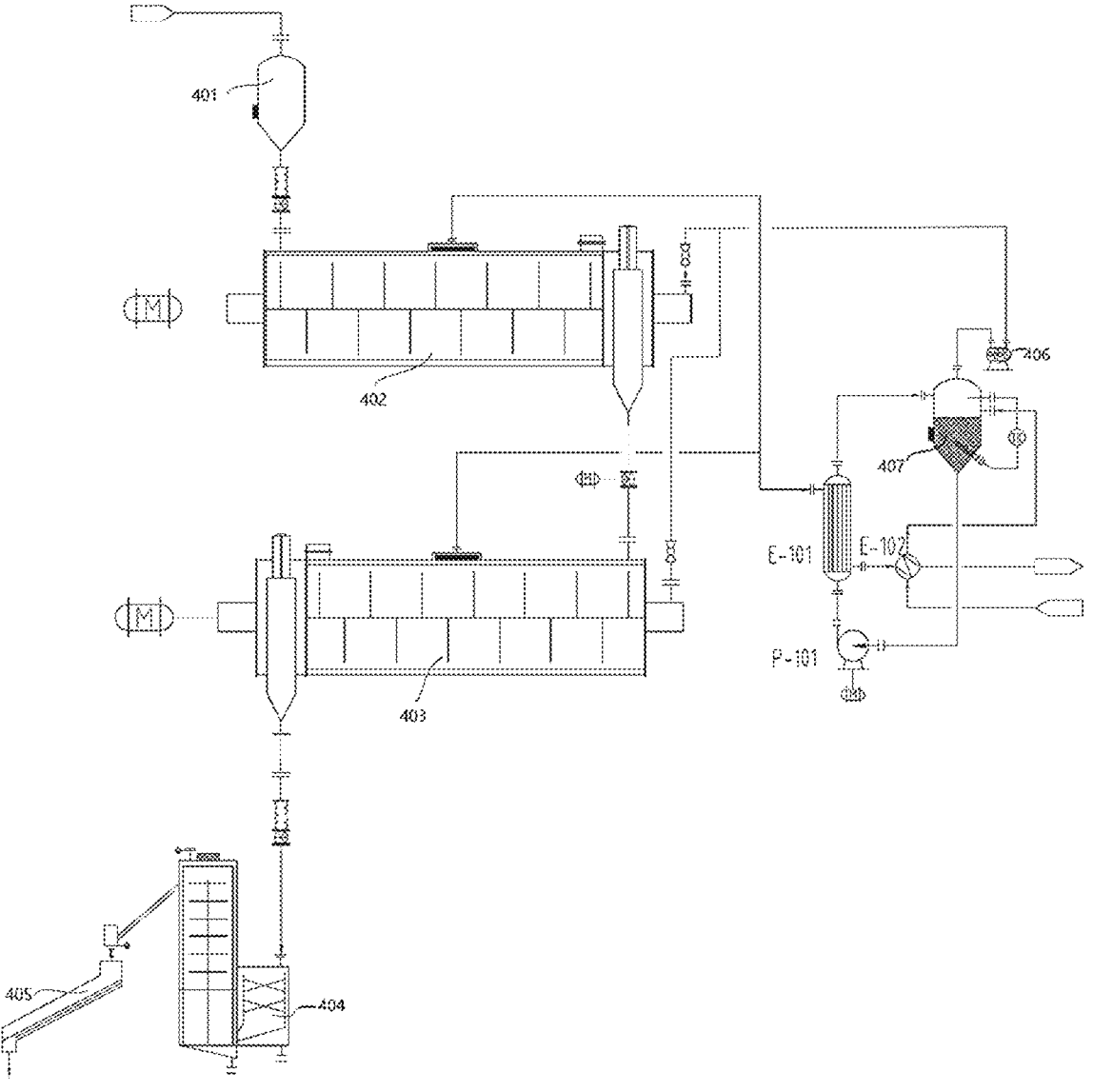
FIG. 4 is a schematic structural diagram of a device for removing VOC from a polymer, preferably ethylene-propylene rubber and reducing odor levels in one example of the present invention; wherein, 401 is the feed buffer tank, 402 is the first horizontal rotary furnace, 403 is the second horizontal rotary furnace, 404 is the particle centrifugal dehydrator, 405 is the vibrating screen, 406 is the steam compressor, 407 is the flash evaporation tank, E101 is the first heat exchanger, E102 is the second heat exchanger, and P101 is the water pump flash evaporation tank.

The following Examples 39-44 were carried out using the device shown in FIG. 2 (processing capacity 1 Kg/h):

Example 39

The high-pressure polyethylene pellets (LDPE, material packed by production device, VOC content: 120 ppm, odor level 4.5) with a water content of 1%, which were pelletized underwater on the production device, and then centrifugally dehydrated, were loaded into the micro negative pressure steam stripper of the experimental device. There is a valve at the bottom of the tower connected to the water tank. The water was heated to 60° C. with steam. The absolute pressure in the tower is controlled to be about 19930 Pa by a negative pressure blower at the top of the tower. The hot water was evaporated into steam, and then rose to the tower to heat the polyethylene pellets. After heated for 2 h, the materials were quenched to 45° C. with cold water, then discharged. The polyethylene resin was treated according to the processing method of the industrial device, i.e. centrifugal dehydration, and then air-dried.

VOC content (VDA 277): 28 ppm; odor level: 3.5.

Example 40

The high density polyethylene pellets (HDPE, slurry process, material packed by production device, VOC content: 165 ppm, odor level 4.5) with a water content of 1%, which was pelletized underwater on the production device, and then centrifugally dehydrated, were loaded into the micro negative pressure steam stripper of the experimental device. There is a valve at the bottom of the tower connected to the water tank. The water was heated to 75° C. with steam. The absolute pressure in the tower is controlled to be about 38560 Pa by a negative pressure blower at the top of the tower. The hot water was evaporated into steam, and then rose to the tower to heat the polyethylene pellets. After heated for 2 h, the materials were quenched to 45° C. with cold water, then discharged. The polyethylene resin was treated according to the processing method of the industrial device, i.e. centrifugal dehydration, and then air-dried.

VOC content (VDA 277): 26 ppm; odor level: 3.6.

Example 41

The high density polyethylene pellets (HDPE, gas phase process, material packed by production device, VOC content: 180 ppm, odor level 4.8) with a water content of 1%, which was pelletized underwater on the production device, and then centrifugally dehydrated, were loaded into the micro negative pressure steam stripper of the experimental device. There is a valve at the bottom of the tower connected to the water tank. The water was heated to 75° C. with steam. The absolute pressure in the tower is controlled to be about 38560 Pa by a negative pressure blower at the top of the tower. The hot water was evaporated into steam, and then rose to the tower to heat the polyethylene pellets. After heated for 2 h, the materials were quenched to 45° C. with cold water, then discharged. The polyethylene resin was treated according to the processing method of the industrial device, i.e. centrifugal dehydration, and then air-dried.

VOC content (VDA 277): 22 ppm; odor level: 3.7.

Example 42

The commercially available POE resin (VOC content: 160 ppm, odor level 4.8) was loaded into the micro negative pressure steam stripper of the experimental device. There is a valve at the bottom of the tower connected to the water tank. The water was heated to 70° C. with steam. The absolute pressure in the tower is controlled to be about 31180 Pa by a negative pressure blower at the top of the tower. The hot water was evaporated into steam, and then rose to the tower to heat the POE pellets. After heated for 3 h, the materials were quenched to 40° C. with cold water, then discharged. The POE resin was treated according to the processing method of the industrial device, i.e. centrifugal dehydration, and then air-dried.

VOC content (VDA 277): 35 ppm; odor level: 3.8.

Example 43

The commercially available OBC resin (VOC content: 250 ppm, odor level 4.5) was loaded into the micro negative pressure steam stripper of the experimental device. There is a valve at the bottom of the tower connected to the water tank. The water was heated to 80° C. with steam. The absolute pressure in the tower is controlled to be about 47370 Pa by a negative pressure blower at the top of the tower. The hot water was evaporated into steam, and then rose to the tower to heat the OBC pellets. After heated for 3 h, the materials were quenched to 40° C. with cold water, then discharged. The OBC resin was treated according to the processing method of the industrial device, i.e. centrifugal dehydration, and then air-dried.

VOC content (VDA 277): 40 ppm; odor level: 3.6.

Example 44

The commercially available LLDPE resin (VOC content: 185 ppm, odor level 4.8) was loaded into the micro negative pressure steam stripper of the experimental device. There is a valve at the bottom of the tower connected to the water tank. The water was heated to 65° C. with steam. The absolute pressure in the tower is controlled to be about 25020 Pa by a negative pressure blower at the top of the tower. The hot water was evaporated into steam, and then rose to the tower to heat the LLDPE pellets. After heated for 3 h, the materials were quenched to 40° C. with cold water, then discharged. The LLDPE resin was treated according to the processing method of the industrial device, i.e. centrifugal dehydration, and then air-dried.

VOC content (VDA 277): 35 ppm; odor level: 3.2.

Example 45

The operation of using steam to remove VOCs in ethylene propylene rubber, and to reduce odor levels can be an intermittent operation or continuous operation. The appropriate operation mode is selected according to the working conditions. Different operation modes do not affect the effect of steam treatment.

General Approach 1: Intermittent Operation

The polymer and water were added to the steaming device and the system was replaced with nitrogen. After the air was exhausted, a saturated steam at a certain temperature was introduced. The discharge rate of the steam from the steaming device was controlled and the operating pressure of the steaming device was maintained as corresponding to the pressure of the saturated steam. The steaming was carried out for a certain period of time, during which the condensed water was periodically discharged from the bottom of the steaming device. After steaming, the device was evacuated, the material was thoroughly dehydrated, dried and cooled to a certain temperature to obtain qualified material.

General Approach 2: Continuous Operation

Polymer and water were added into the silo at the top of the steaming device. After the air was exhausted, and a saturated steam at a certain temperature was introduced, wherein the speed of the material at which the material enters the steaming device was controlled by the rotary valve. The discharge rate of the steam from the steaming device was controlled and the operating pressure of the steaming device was maintained as corresponding to the pressure of the saturated steam. The condensed water was periodically discharged from the bottom of the steaming device. The opening of the discharge valve of the steaming device is controlled to ensure the residence time of the materials in the steaming device. The materials coming out of the steaming device are thoroughly dehydrated, dried and cooled to a certain temperature to obtain qualified materials.

Wherein, examples 45-1, 45-22, 45-23, 45-24, and 45-25 were carried out with intermittent operation, and other examples were carried out with continuous operations.

Whether the operation is an intermittent operation or continuous operation only differs in the operation and does not affect the removal effect.

Examples of VOC Removal of Ethylene Propylene Rubber

| Example No. | Mooney Viscosity ML1 ± 4 125° C. | Steam Usage (Kg/h/t) | Temperature (° C.) | Time (h) | VOC/(μg/g) Raw Materials | Products | Odor Level Raw Materials | Products |
|---|---|---|---|---|---|---|---|---|
| 45-1 | 10 | 120 | 115 | 1 | 270 | 25 | 5.5 | 3.5 |
| 45-2 | 24 | 50 | 115 | 2 | 321 | 10 | 6.0 | 3.0 |
| 45-3 | 25 | 80 | 110 | 3 | 221 | 30 | 5.5 | 3.7 |
| 45-4 | 28 | 25 | 110 | 2 | 234 | 42 | 5.5 | 3.5 |
| 45-5 | 33 | 50 | 115 | 2 | 262 | 52 | 5.5 | 3.6 |
| 45-6 | 35 | 40 | 110 | 3 | 198 | 35 | 5.0 | 3.6 |
| 45-7 | 30 | 60 | 115 | 2 | 242 | 33 | 5.5 | 3.5 |
| 45-8 | 40 | 25 | 115 | 3 | 231 | 39 | 5.0 | 3.5 |
| 45-9 | 45 | 70 | 110 | 2 | 254 | 42 | 5.5 | 3.7 |
| 45-10 | 48 | 40 | 115 | 3 | 367 | 43 | 5.0 | 3.6 |
| 45-11 | 50 | 30 | 110 | 2 | 278 | 24 | 5.5 | 3.6 |
| 45-12 | 52 | 10 | 105 | 3 | 244 | 51 | 5.0 | 3.5 |
| 45-13 | 53 | 35 | 115 | 2 | 207 | 20 | 5.5 | 4.1 |
| 45-14 | 55 | 25 | 115 | 1 | 191 | 26 | 5.5 | 3.8 |
| 45-15 | 60 | 110 | 105 | 3 | 263 | 34 | 5.5 | 3.3 |
| 45-16 | 62 | 90 | 105 | 3 | 219 | 21 | 5.5 | 3.5 |
| 45-17 | 65 | 120 | 115 | 1 | 317 | 32 | 5.5 | 3.5 |
| 45-18 | 63 | 100 | 115 | 1.5 | 266 | 16 | 5.5 | 3.8 |
| 45-19 | 68 | 60 | 110 | 3 | 189 | 36 | 5.5 | 3.9 |
| 45-20 | 70 | 50 | 110 | 3 | 227 | 45 | 4.5 | 3.8 |
| 45-21 | 75 | 30 | 105 | 3 | 258 | 46 | 4.6 | 3.5 |
| 45-22 | 80 | 60 | 110 | 3 | 267 | 44 | 5.0 | 3.5 |
| 45-23 | 85 | 30 | 110 | 3 | 376 | 43 | 5.0 | 3.5 |
| 45-24 | 100 | 15 | 110 | 3 | 379 | 35 | 5.0 | 3.5 |
| 45-25 | 120 | 20 | 110 | 3 | 421 | 48 | 5.0 | 3.8 |
| 45-26 | 130 | 110 | 105 | 3 | 362 | 46 | 5.5 | 3.9 |
| 45-27 | 140 | 80 | 105 | 3 | 389 | 51 | 5.0 | 3.7 |
| 45-28 | 150 | 60 | 110 | 2 | 470 | 52 | 6.0 | 3.5 |

Examples of VOC Removal of Polyolefin Elastomer (POE)

| Example No. | Melt Flow Index g/10 min | Steam Usage (Kg/h/t) | Temperature (° C.) | Time (h) | VOC/(μg/g) Raw Materials | Products | Odor Level Raw Materials | Products |
|---|---|---|---|---|---|---|---|---|
| 45-29 | 0.5 | 50 | 115 | 2 | 105 | 25 | 3.8 | 3.5 |
| 45-30 | 0.8 | 80 | 110 | 2 | 99 | 31 | 3.7 | 3.4 |
| 45-31 | 1.0 | 25 | 120 | 1 | 97 | 11 | 3.9 | 3.5 |
| 45-32 | 1.2 | 50 | 115 | 1 | 113 | 30 | 3.8 | 3.3 |
| 45-33 | 1.6 | 40 | 115 | 1 | 102 | 32 | 3.8 | 3.5 |
| 45-34 | 3 | 60 | 110 | 2 | 98 | 34 | 3.9 | 3.4 |
| 45-35 | 5 | 25 | 115 | 1 | 109 | 22 | 3.8 | 3.2 |
| 45-36 | 8 | 70 | 110 | 2 | 106 | 33 | 3.8 | 3.5 |
| 45-37 | 13 | 40 | 115 | 2 | 96 | 22 | 3.7 | 3.4 |
| 45-38 | 18 | 30 | 115 | 2 | 113 | 32 | 3.8 | 3.2 |
| 45-39 | 30 | 10 | 120 | 1 | 126 | 24 | 4.0 | 3.5 |
| 45-40 | 33 | 120 | 105 | 3 | 121 | 35 | 3.9 | 3.2 |
| 45-41 | 48 | 90 | 110 | 2 | 119 | 31 | 3.8 | 3.0 |

Examples of VOC Removal of Olefin Block Copolymer (OBC)

| | Melt Flow | Steam | | | VOC/($\mu$g/g) | | Odor Level | |
| --- | --- | --- | --- | --- | --- | --- | --- | --- |
| Example No. | Index g/10 min | Usage (Kg/h/t) | Temperature (° C.) | Time (h) | Raw Materials | Products | Raw Materials | Products |
| 45-42 | 0.5 | 50 | 115 | 1 | 115 | 45 | 3.8 | 3.4 |
| 45-43 | 1 | 40 | 110 | 2 | 108 | 51 | 3.8 | 3.3 |
| 45-44 | 5 | 60 | 110 | 1 | 117 | 48 | 3.8 | 3.5 |
| 45-45 | 15 | 25 | 115 | 3 | 103 | 30 | 3.8 | 3.5 |

All documents mentioned herein are incorporated herein by reference as if each document were individually incorporated by reference. In addition, it should be understood that after reading the above taught content of the present invention, those skilled in the art can make various changes or modifications to the present invention, and these equivalent forms also fall within the scope defined by the appended claims of the present application.

What is claimed is:

1. A method for removing volatile organic compounds (VOC) in a polymer, reducing polymer odor, and removing inorganic ash, comprising the step of:

in a reaction system, continuously contacting water vapor, in a phase equilibrium state, with the polymer for 0.5-6 hours by:

(a) loading polymer in an equipment, wherein the equipment is a vertical or horizontal equipment;

(b) passing the water vapor, in the phase equilibrium state, through the equipment, continuously and directly contacting the polymer for 0.5-6 hours, while discharging the water vapor after contacting the polymer, wherein a temperature of the water vapor is 100-200° C.;

(c) dehydrating and drying the polymer; and (d) discharging and collecting the dehydrated and dried polymer;

wherein the method removes volatile organic compounds (VOCs) and odor-forming components from the polymer by the continuous contacting of the polymer with the water vapor, so as to dissolve and remove the inorganic ash from the polymer; and wherein during the contacting of the polymer with the water vapor, an oxygen content of the reaction system is lower than 0.1% (v/v).

2. The method of claim 1, further comprising:

in the reaction system and in step (b), continuously contacting the water vapor in the phase equilibrium state with the polymer for 0.5-3 hours.

3. The method of claim 1, wherein during the contacting of the polymer with the water vapor, the oxygen content of the reaction system is lower than 100 ppm.

4. The method of claim 1, further comprising:

before continuously contacting the water vapor in the phase equilibrium state with the polymer for 0.5-6 hours in the reaction system, the reaction system is first purged with an inert gas or water vapor to replace air in the reaction system.

5. The method of claim 1, further comprising:

continuously introducing water vapor into the reaction system while simultaneously discharging steam and/or condensed water; wherein a speed at which the steam is discharged is 1-200 Kg water vapor/ton polymer/hour.

6. The method of claim 1, wherein the polymer is selected from polyethylene (PE), polypropylene (PP), ethylene propylene rubber (EPDM, EPM), polyolefin elastomer (POE), polybutene PB-1, acrylonitrile/butadiene/styrene terpolymer (ABS), olefin block copolymer (OBC), nylon (PA), polycarbonate (PC), polyethylene terephthalate (PET), polybutylene terephthalate (PBT), polystyrene or polyphenylene sulfide, or a combination thereof.

7. The method of claim 1, wherein the polymer is polypropylene (PP) or polypropylene-random (PPR); and a melt flow index range of the polypropylene (PP) or polypropylene-random (PPR) is 0.1-2000 g/10 min measured according to GB/T 2682-2000.

8. The method of claim 1, wherein a temperature of the water vapor is about 20-50° C. 20-50° C. lower than a melting point of the polymer.

9. The method of claim 1, wherein:

when a particle diameter of the polymer is <1 mm and a VOC content in the polymer is <2000 ppm, a time for which the polymer is kept at a temperature corresponding to saturated water vapor is 0.5-3 h;

when the particle diameter of the polymer is <1 mm and the VOC content in the polymer is ≥2000 ppm, the time for which the polymer is kept at the temperature corresponding to saturated water vapor is 1-5 h;

when the particle diameter of the polymer is ≥1 mm and the VOC content in the polymer is <1000 ppm, the time for which the polymer is kept at the temperature corresponding to saturated water vapor is 1-5 h; or when the particle diameter of the polymer is ≥1 mm and the VOC content in the polymer is ≥1000 ppm, the time for which the polymer is kept at the temperature corresponding to saturated water vapor is 3-7 h.

10. The method of claim 1, further comprising carrying out the method using the reaction system, wherein the reaction system comprises:

a steam stripping tower, wherein the equipment comprises the steam stripping tower;

a feed valve block located upstream of the steam stripping tower, the feed valve block is connected to a top feed port of the steam stripping tower, and is used to control entry of the polymer into the steam stripping tower; and a discharge valve block located downstream of the steam stripping tower, the discharge valve block is used to control flow of the polymer out of the steam stripping tower;

optionally, wherein the reaction system further comprises:

a pre-dehydration tower located upstream of the feed valve block; and/or a condenser wherein, an inlet of the condenser is connected with an exhaust outlet of the steam stripping tower, and an outlet of the condenser is connected with a condensate tank; and/or

a circulating water-cooling system wherein, the circulating water-cooling system is used to quench the polymer discharged from the steam stripping tower.

11. The method of claim 10, further comprising steps of:

(i) passing the polymer through the feed valve block and so that it enters the top feed port of the steam stripping tower;

(ii) passing steam through the steam stripping tower, and carrying out heat exchange with the polymer, so that an operating pressure inside the steam stripping tower corresponds to a saturated vapor pressure; and (iii) discharging the polymer, wherein the discharge of the polymer is controlled by a rotary discharge valve block.

12. The method of claim 1, further comprising carrying out the method using the reaction system, wherein the reaction system comprises:

a micro negative pressure steam stripping tower, wherein the equipment comprises the micro negative pressure steam stripping tower;

a feed valve block located upstream of the micro negative pressure steam stripping tower, the feed valve block is connected to a top feed port of the micro negative pressure steam stripping tower, and is used to control entry of the polymer as a resin into the micro pressure steam stripping tower; and a discharge valve block located downstream of the micro negative pressure steam stripping tower, the discharge valve block is used to control the flow of the resin out of the micro negative pressure steam stripping tower.

13. The method of claim 12, wherein the method further comprises:

(i) passing the polymer into the feed valve block, so that it enters the top feed port of the micro negative pressure steam stripping tower;

(ii) passing steam into water at a bottom of the micro negative pressure steam stripping tower, wherein a temperature in the micro negative steam stripping tower is controlled to generate steam and to carry out heat exchange with the resin which is an polyethylene or ethylene copolymer, so that the temperature of the polyethylene or ethylene copolymer is controlled at 50-95° C. to remove gas-phase impurity molecules;

(iii) operating the rotary discharge valve block to discharge the resin.

14. The method of claim 1, further comprising carrying out the method using the reaction system, wherein the reaction system comprises:

a wet nitrogen stripping tower, wherein the equipment comprises the wet nitrogen stripping tower;

a feed valve block located upstream of the wet nitrogen stripping tower, the feed valve block is connected to a top feed port of the wet nitrogen stripping tower, and is used to control the polymer in the form of a resin entering the wet nitrogen stripping tower;

a discharge valve block located downstream of the wet nitrogen stripping tower, the discharge valve block is used to control flow of the resin out of the wet nitrogen stripping tower;

a pre-dehydration tower located upstream of the feed valve block; and a condenser, an inlet of the condenser is connected with an exhaust outlet of the wet nitrogen stripping tower, and an outlet of the condenser is connected with a condensate tank.

15. The method of claim 14, wherein the method comprises:

(1) passing the polymer in the form of a resin crude product into the top feed port of the wet nitrogen stripping tower through the feed valve block;

(2) passing wet nitrogen into the wet nitrogen stripping tower to carry out exchange heat with the crude resin product, and the crude resin product is heated to 50-95° C., so that VOC in the resin is desorpted;

(3) discharging the crude resin product, wherein the discharging is controlled through the discharge valve block.

16. The method of claim 1, further comprising carrying out the method using the reaction system, wherein the reaction system comprises:

a feed buffer tank, the feed buffer tank is used for temporarily storing the polymer, from which the VOC needs to be removed and the odor needs to be reduced;

a horizontal rotary furnace component, wherein the equipment comprises the horizontal rotary furnace component and; the horizontal rotary furnace component is located downstream of the feed buffer tank, and comprises a first horizontal rotary furnace and a second horizontal rotary furnace, and the horizontal rotary furnace component is a cascaded structure; and wherein the first horizontal rotary furnace and the second horizontal rotary furnace respectively have a material inlet, a steam inlet valve and an exhaust discharge valve.

17. The method of claim 16, the method further comprises:

(1) adding the polymer, from which the VOC needs to be removed and/or the odor needs to be reduced, into the feed buffer tank, wherein the first horizontal rotary furnace and the second horizontal rotary furnace are run, and steam is continuously injected into the horizontal rotary furnace component, while the material inlet is opened for feeding;

(2) keeping the polymer in the horizontal rotary furnace component, so that an azeotrope is formed from the VOC and the steam, and then opening the exhaust gas discharge valve to discharge the azeotrope from the horizontal rotary furnace component.

18. The method of claim 10, wherein the reaction system comprising the circulating water-cooling system, and the circulating water-cooling system comprises: a heat exchanger located downstream of the discharge valve block, and the heat exchanger is connected to a circulating water tank through a conveying pump; and/or a Venturi feeder, wherein a first inlet of the Venturi feeder is connected with the discharge valve block, and a second inlet is connected with the heat exchanger.

* * * * *